United States Patent
Gray, Jr. et al.

(10) Patent No.: US 7,014,429 B2
(45) Date of Patent: Mar. 21, 2006

(54) HIGH-EFFICIENCY, LARGE ANGLE, VARIABLE DISPLACEMENT HYDRAULIC PUMP/MOTOR

(75) Inventors: Charles L. Gray, Jr., Pinckney, MI (US); Andrew J. Moskalik, Detroit, MI (US); Matthew J. Brusstar, South Lyon, MI (US); David K. Gill, Bellevue, MI (US); Keven Berent Fuqua, Clarkston, MI (US); Craig Douglas Moffat, Columbia, SC (US)

(73) Assignee: The United States of America as represented by the Administrator of the U.S. Environmental Protection Agency, Washington, DC (US)

( * ) Notice: Subject to any disclaimer, the term of this patent is extended or adjusted under 35 U.S.C. 154(b) by 256 days.

(21) Appl. No.: 10/379,992

(22) Filed: Mar. 6, 2003

(65) Prior Publication Data

US 2004/0173089 A1    Sep. 9, 2004

(51) Int. Cl.
*F04B 1/12*    (2006.01)
*F01B 13/06*    (2006.01)

(52) U.S. Cl. .............................. 417/269; 92/58; 91/197; 91/503

(58) Field of Classification Search ................ 417/269; 92/57, 58; 91/197, 503
See application file for complete search history.

(56) References Cited

U.S. PATENT DOCUMENTS

| | | | | |
|---|---|---|---|---|
| 3,148,628 A | * | 9/1964 | Boydell | 91/506 |
| 4,799,817 A | * | 1/1989 | Geisthoff | 403/57 |
| 4,872,394 A | | 10/1989 | Nakagawa et al. | 91/506 |
| 4,920,860 A | * | 5/1990 | Alm et al. | 91/504 |
| 4,951,551 A | | 8/1990 | Arai et al. | 91/506 |
| 6,203,283 B1 | | 3/2001 | Fleming et al. | 417/222.1 |
| 6,257,119 B1 | | 7/2001 | Ryken et al. | 91/506 |
| 6,279,452 B1 | * | 8/2001 | Moya | 91/506 |
| 6,378,413 B1 | | 4/2002 | Hoxie | 92/12.2 |
| 6,422,831 B1 | * | 7/2002 | Ito et al. | 417/269 |

* cited by examiner

*Primary Examiner*—Charles G. Freay
(74) *Attorney, Agent, or Firm*—Bacon & Thomas, PLLC

(57) ABSTRACT

A variable displacement hydraulic/pump motor has a yoke with a pair of shafts aligned to define a yoke pivot axis and connected to a valve plate therebetween having intake and discharge apertures. A rotatable cylinder barrel has piston cylinders open at one end to receive a piston head and opening through fluid ports at another end, flush against the valve plate surface. A drive block is mounted on an input/output shaft for rotation about a central axis of rotation inclined at an angle relative to the longitudinal axis of the cylinder barrel which may be changed by a drive engaging the yoke at a point near its pivot axis. Loads on bushings supporting the yoke shafts are reduced by providing radially extending fluid ports in the shafts and in communication with the intake and discharge apertures of the valve plate.

40 Claims, 13 Drawing Sheets

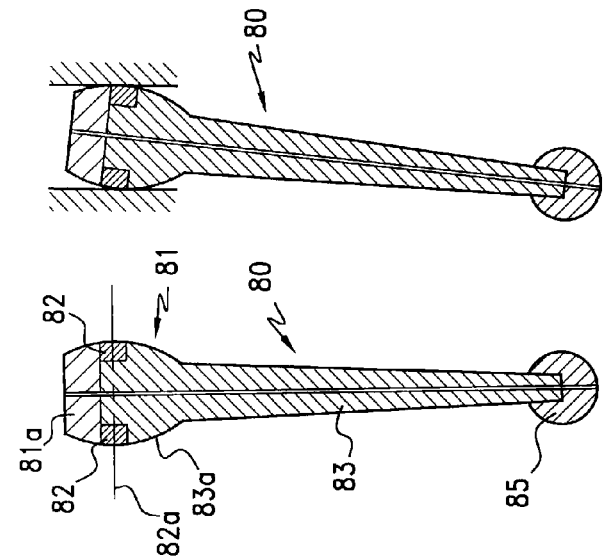
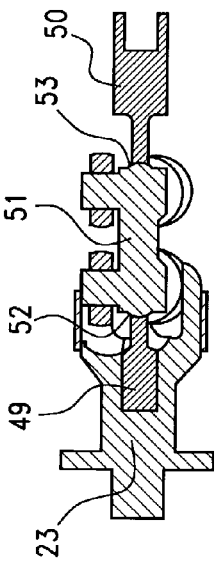
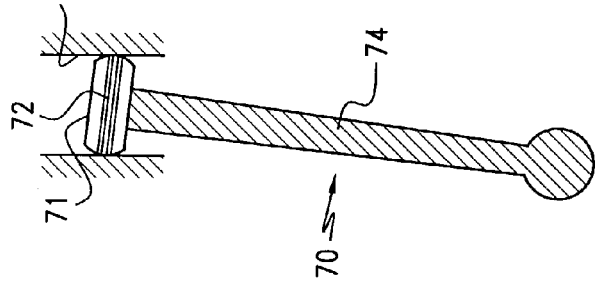
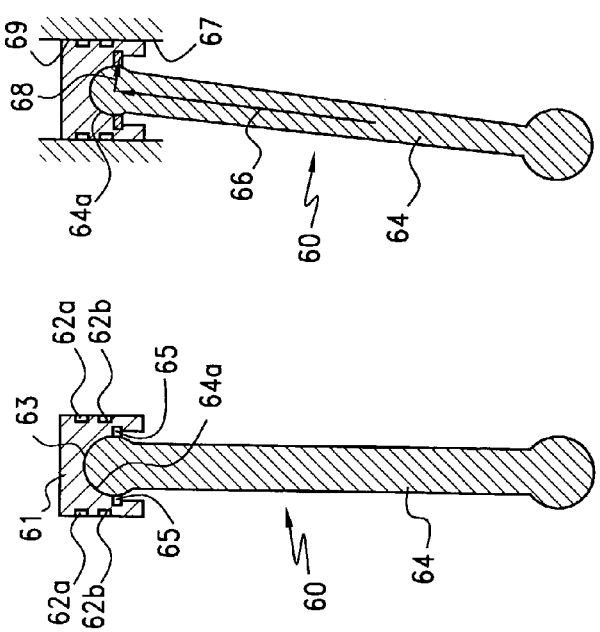
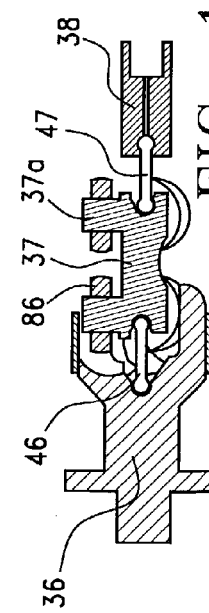
FIG. 6 (PRIOR ART)  FIG. 7 (PRIOR ART)  FIG. 8 (PRIOR ART)  FIG. 9  FIG. 10
FIG. 11 (PRIOR ART)
FIG. 12

HIGH-EFFICIENCY, LARGE ANGLE, VARIABLE DISPLACEMENT HYDRAULIC PUMP/MOTOR

FIELD OF THE INVENTION

The general field of application of the invention is in power transmission devices, particularly variable displacement pump/motors for hybrid automotive use.

THE PRIOR ART

The growing utilization of automobiles greatly adds to the atmospheric presence of various pollutants including oxides of nitrogen and greenhouse gases such as carbon dioxide. Hybrid powertrains have been proposed in a quest for approaches which could significantly improve the efficiency of fuel utilization for automotive powertrains.

Hydraulic pump/motors are suited to many power transmission applications. An emerging application of these devices is in hybrid powertrains for automobiles. An example of such an application is disclosed in U.S. Pat. No. 5,495,912, "Hybrid Powertrain Vehicle" (Gray et al.). U.S. Pat. No. 5,495,912 discloses a drivetrain in which an internal combustion engine provides prime power to a hybrid vehicle while a subsystem consisting in part of one or more variable displacement hydraulic pump/motors serves to store engine power as pressurized fluid in a hydraulic accumulator at times of low road power demand, and to redeliver power from the accumulator at times of high road power demand.

In attempting to incorporate prior art pump/motors into such a system, one finds that such pump/motors are designed for specialized applications such as heavy equipment, industrial machinery, and aircraft control. The dominance of these applications has resulted in a predominance of designs that provide either a fixed displacement or, for those with variable displacements, relatively low peak efficiency limited to a relatively narrow band within the allowable range of speeds and displacements. Unfortunately, the duty cycle that is likely to be encountered in a hybrid automotive application would favor a design that can provide a high efficiency over a particularly broad range of variable displacement and speed. Moreover, if such devices were to be widely incorporated into automobiles, mass market pressures would call for higher quantity production and lower unit cost than is currently available for these devices. Also, automotive applications benefit greatly from reduced weight and volume. As a result, pump/motor designs of the prior art have frequently been found to be poorly suited to hybrid automotive power transmissions which are more demanding in terms of (1) maintaining high efficiency over a wide range of displacements and speeds, (2) adaptability to low cost, quantity production, and (3) for a specified power level, minimum weight and volume.

To fully understand the source of these limitations of prior art it is helpful to review the elements of variable displacement pump/motor design and in particular how their displacement is established.

Hydraulic pumps and hydraulic motors transmit power by conducting pressurized fluid between low pressure and high pressure reservoirs. Hydraulic pumps and motors of axial piston design are among the most efficient. For example, bent axis designs employ a rotating cylinder barrel containing a plurality of cylinders (typically seven to nine), which receive an assembly of reciprocating pistons (relative to the barrel). The pistons transfer power to and from an output/input shaft by their connection to a drive plate or drive block to which they are pivotably connected typically by ball and socket joints. In many designs the cylinder barrel and drive block are additionally connected by a universal joint.

The basic design of most axial piston pumps and motors potentially allows them to operate both as a fluid pump and as a motor, and so these devices are often referred to as pump/motors. When acting as a pump, mechanical power from an external source acts on a rotating input shaft which drives the piston/cylinder assembly in a way that creates reciprocatory motion of the pistons that in turn results in the pumping of fluid from a low pressure source to a high pressure source. When acting as a motor, fluid from the high pressure source flows in a reverse manner through the piston/cylinder assembly to the low pressure source, causing a reciprocatory motion of the pistons that delivers mechanical power to the rotating shaft which now acts as an output shaft.

The displacement of a hydraulic pump/motor (expressed in units such as cubic centimeters of fluid per revolution of the shaft) is established by the relative angle between the axis of the cylinder barrel which receives the pistons and the axis of the drive block on which the pistons act and are retained. Because the cylinder barrel and the drive block rotate together and are connected by the piston rods, the angle between them determines the stroke of the pistons and hence the displacement per revolution. In a fixed displacement design, for example, that of the type described in U.S. Pat. No. 4,579,043 (Rexroth), the angle is fixed and thus the displacement is fixed. In a variable displacement design, of which U.S. Pat. No. 5,488,894 describes one example, the angle can be varied during operation through an actuation means that varies the angle between the axis of the cylinder barrel and the axis of the drive block, thereby altering the displacement. In general, the larger the angle between the axes of the cylinder barrel and drive block, the longer the stroke of each piston per revolution, and hence the larger the total displacement per revolution. Conversely, zero displacement is approached when the axis of the cylinder barrel and the axis of the drive block approach a parallel alignment, which causes the stroke of the pistons to approach zero. Some designs not only accommodate such a zero displacement or "idling" position, but also allow the axis to proceed beyond this position in a condition referred to as "over center", which results in a change in mode from motor to pump or pump to motor depending on whether the angle achieved is on the positive or negative side of the parallel condition. The machine described in U.S. Pat. No. 4,991,492 is one example of the "over center" type.

The prior art is dominated by two alternative methods for achieving a variable angle between the axes of the drive block and cylinder barrel. One method, commonly known as the swash plate design, varies the angle of a pivotable swash plate, which is a drive block that pivotably connects with the input/output shaft. The other, called the bent-axis design, instead pivots the cylinder barrel with respect to the drive block which remains at a fixed angle relative to the shaft. The bent-axis design houses the cylinder barrel in a cylinder body that pivots about a pivot point and provides fluid entry and exit through communication with a valve plate near the free end of the cylinder body. The bent-axis design is generally considered to provide better overall efficiency compared to other designs (for example, refer to the table of typical efficiencies provided in U.S. Pat. No. 4,271,725) and for this reason could be considered as better suited for automotive applications. Therefore, the bent-axis design is considered the most relevant prior art for the present invention.

The efficiency of the best conventional bent-axis designs peaks at values in excess of 90%, but only over a small portion of their allowable range of speed and displacement. At larger or smaller displacements and speeds, efficiency falls off dramatically. This narrow range of peak efficiency is a limitation encountered by other designs as well. Below about 50% of maximum displacement, mechanical losses and fluid compressibility losses become dominant sources of inefficiency. At larger displacements, the influence of the mechanical and compressibility losses are minimized by the longer piston stroke associated with larger displacements, but especially at higher speeds, flow losses become more significant.

With consideration of the basic design features of hydraulic pump/motors, the shortcomings of prior art designs in providing the above-mentioned desirable attributes for automotive applications will now be examined in turn.

(1) Large Angle for Maximum Displacement and Broad Range of High Efficiency

The design of prior art pump/motors imposes a number of obstacles that limit the achievable range of variable displacement angle. Typically, the maximum angle is limited by factors such as geometry or material properties that limit the bend angle, and by performance considerations that diminish efficiency or practicality. Due to these constraints, all variable displacement hydraulic pump/motors are limited to some maximum allowable angle. Prior art bent-axis designs rarely exceed a maximum angle of 30 degrees with about 25 degrees of variation, with the largest known maximum angle only about 40 degrees with 32 degrees of variation.

Another constraint is imposed by the need for the cylinder body (i.e., the barrel) to maintain communication with a fluid source throughout the allowable angle of pivot. This is most commonly achieved via a sliding connection between the barrel back plate having fluid ports and the fixed fluid ports in the pump/motor body. The finite size (to avoid excessive leakage) and fixed location of the fluid ports impose a limit on the maximum displacement angle because they must remain in communication with the moving barrel block plate at all of its positions without introducing undue fluid flow restrictions at the extremes.

Yet another constraint of most prior art designs stems from the fact that bent-axis units of the prior art typically pivot the cylinder body by use of a linear actuator acting on the outer arc of the angle through which the body can travel, that is, near the free end of the cylinder body. Here, to sweep the body through a large displacement angle requires a long actuation stroke owing to the longer chord of the arc of travel at this location. The need for a long actuation stroke prompts an increase in the dimensions of the control head which in turn leads to an undesirable increase in the overall dimensions of the machine. It is known in the prior art that actuation means may be relocated away from the outer arc toward the pivot point of the cylinder body, for example as described in U.S. Pat. No. 4,893,549 in which the device employs two counteracting servo pistons acting near the midpoint of the cylinder body. However, this innovation did not relocate actuation optimally close to the pivot point, and in fact was employed in a conventional back-plate design, rather than in a yoke design.

It is known in the prior art that fluid flow may alternatively be provided through passages within a yoke which houses the cylinder barrel and moves the barrel through its pivot angle. (Vickers bent axis pump motor AA606). This design can reduce the flow-related limit on pivot angle because it eliminates the necessity for fluid to be conducted through ports along a sliding interface with the back plate. Instead, fluid may enter through a point on the yoke, for example at its pivot point. Another example of this type of design may be seen in U.S. Pat. No. 4,991,492. In this example, a sliding contact with the outer case is retained for guidance and only one side of the yoke is used for fluid conduction. In other yoke-based designs, both sides of the yoke contain fluid passages, and the travel of the yoke is guided primarily by the retention of the yoke pins on which the yoke pivots.

But even in yoke-based designs, several additional constraints continue to act to limit the maximum angle. The use of a yoke does not prevent physical interference between parts such as the piston rods and the cylinder walls as the angle increases. Other geometric limits primarily involve the design of the cylinder barrel/drive block interface, in particular the design and arrangement (i.e., packaging) of a sufficiently strong universal drive joint mechanism, the connection rod retention mechanism that joins the piston rods to the drive block (usually spherical balls in the ends of the rods pivoting in sockets in the drive plate/block), and the relative diameters of the barrel cylinder centerline and the driveplate ball socket centerline. (For example, to achieve a larger displacement angle without encountering interference between the piston connecting rods and the bottom edges of their cylinders, the diameter of the piston ball socket centerline should be increased with respect to that of the cylinder bores.) Also concerns about possible barrel tipping at the valve plate interface with the higher piston side forces on the barrel, acting at greater distances from the barrel to valve plate interface (with the longer piston strokes), tended to discourage the pursuit of high angles.

(1a) Minimizing Flow and Compressibility Losses and Fluid Leakage

In normal operation as the cylinder barrel/drive block assembly rotates, the angle at which an individual piston rod will be inclined with respect to the walls of its cylinder will typically vary by 2 to 3 degrees, as the rod sweeps through a cone-shaped path with each revolution of the assembly. The magnitude of this variation or "wobble" is governed primarily by the angle of the barrel to the drive plate and the difference in the diameter of the centerline of the ball sockets on the drive block and the centerline of the cylinder bores in which the pistons reciprocate. Because as previously mentioned the diameter of the ball socket centerline should be increased relative to that of the cylinder bores in a large angle design, the pistons rods are likely to encounter wobble angles of 5 to 6 degrees or more.

Increased wobble angle leads to two issues associated with large displacements. First, a large wobble means that the pistons reciprocate at a larger angle with respect to the cylinder, transmitting higher side forces to the cylinder wall, potentially increasing wear, and also increasing the possibility of fluid loss by tipping. Second, a larger wobble angle may lead to increased leakage past the piston head depending on the method by which the piston head attains a seal with the cylinder walls. Leakage past reciprocating surfaces is typically addressed by the design of the piston head to include a secondary sealing means such as metallic or polymer rings. In designs that employ a pivoting connection between piston head and connecting rod, such rings are commonly employed but continue to allow some leakage especially as cylinder wear accumulates. In prior art designs that employ a rigid connection between piston head and connecting rod, any tilt in the piston leads directly to an equal tilt in the piston head. This complicates the problem of attaining a reliable seal due to the difference between the circular shape of the piston head and the elliptical shape of its interface with the cylinder wall when the piston head is tilted. In at least one commercial design attributed to VOAC, a number of circular metallic rings with variable eccentricity are employed to approximate such a seal, but this design is still prone to significant leakage even at relatively low angles.

Another impediment to maintaining good flow efficiency at a large displacement angle stems from the need to provide large fluid flow rates into and out of the cylinder barrel at large displacements and speeds. This is due to the increased stroke of the pistons at large displacement angles compared to the smaller stroke at small displacement angles. Previous designs have met with limited success in enlarging the fluid ports to accommodate high flow rates.

(1b) Minimizing Mechanical Losses

Friction is a dominant cause of mechanical loss, encountered at reciprocating surfaces such as the piston head/cylinder wall interface, interfaces such as the cylinder barrel/valve plate, the ball sockets by which the piston rods are retained on the drive block, bushings on which the yoke pivots, and bearings which react the forces imposed by the pistons on the drive plate which is supported by the input/output shaft. Of particular concern is friction at the ball sockets because reducing friction at this complex interface is also critical to increasing the life cycle of the device. Providing reliable lubrication at this interface would reduce losses significantly but has proven to be difficult to achieve.

(1c) Minimizing Tipping

The issue of tipping becomes problematic at large displacement angles because side forces exerted on the cylinder barrel by the reciprocating pistons tend to increase as the displacement angle increases, and their leverage increases as the angle causes them to act at greater distances from the barrel to valve plate interface. Since the cylinder barrel must be free to rotate within the yoke, there are only a limited number of options for providing resistance to side forces to ensure that the barrel remains properly seated. The primary method employed in the prior art is a hold-down device which rotatably clamps the barrel to the valve plate on which it rotates. Increased hold down force is therefore one option to prevent tipping, but this technique would increase the normal force acting on the interface between barrel and valve plate and thus lead to increased losses due to friction.

(2) Quantity Production

None of the dominant applications of hydraulic pump/motors strongly demand optimization of unit cost in quantity production. Because prior art pump/motor designs that are currently being manufactured are marketed to a relatively small market compared to the potential size of the automotive market, aggressive design optimization to reduce unit cost has not been a high priority because under these conditions such an effort may not be cost effective. As a result, there exists significant room for improvement in manufacturing and material costs for such devices.

(3) Minimum Weight and Volume

One trait of most currently produced designs is their rugged, heavyweight nature. In heavy equipment applications, ruggedness and weight are positive attributes due to the environment in which these devices are likely to be used. Stationary industrial applications do not require these traits as explicitly but, conversely, are not likely to suffer from them. As a result, reduction of weight does not appear to have been a priority in the dominant commercial designs. Likewise, minimization of package volume is not a critical concern in heavy equipment or industrial applications. Although aircraft control applications do call for lightweight and small volume, this application is the smallest fraction of existing usage and has not led to commercially viable lightweight and compact designs for other applications.

One reason for the large weight of prior art yoke-based designs is the need to resist distortive forces that act upon the yoke during normal operation as well as the large amount of force that must be resisted by bushings on which the yoke pivots (the origin of these forces will be discussed in a later section). These forces might be reduced if they could be balanced properly. The provision of a balancing force in reaction to varying pivot angles is known in the prior art. For example, U.S. Pat. No. 5,182,978 provides the drawing out of high pressure fluid to a hydrostatic radial or thrust bearing in response to changes in pivot angle.

In summary, the emergence of hybrid automotive applications of variable displacement hydraulic pump/motors provides a strong motivation to provide a bent-axis pump/motor design having a large maximum displacement angle and broad range of displacement variation, a broad band of speed and displacement at which high efficiency may be maintained, adaptability to quantity production at low cost, and minimum weight and volume.

SUMMARY OF THE INVENTION

The present invention achieves higher efficiencies over a broader range of displacement and speed than prior art due to the much higher displacement angles achieved by the incorporation of several novel design features. For a given displacement, the large angle of the present invention allows reduced piston diameter, reduced barrel diameter, reduced bearings size, reduced valve plate to barrel contact area, lower piston forces and lower ball to socket forces (all resulting in reduced friction and reduced cost).

Important to achieving high efficiency across small and large displacements is the discovery of effective strategies for (1a) minimizing flow and compressibility losses and fluid leakage, (1b) minimizing mechanical losses, and (1c) minimizing the chance of tipping. "Tipping" is a mode of fluid leakage that presents a higher risk at large angles, caused by momentary unseating of the cylinder barrel from the valve plate on which it normally rotates.

The present invention is based in part on a realization that a large displacement angle provides advantages for mechanical and hydraulic efficiency. A large displacement angle provides a longer stroke for each piston, which allows a smaller diameter piston and cylinder and a smaller piston notch circle, leading to lower fluid leakage losses and lower piston loads which in turn lead to less friction in the lower ball socket of each piston rod. A smaller piston notch circle also leads to lower valve plate leakage and lower friction torque on the valve plate. The invention therefore attains the maximum possible displacement angle by overcoming the shortcomings encountered in the prior art.

The present invention balances the forces on the bushings which support the yoke pins through use of slanted O-rings rather than by a variable throttle or control valve employed in the prior art.

(1) Large Angle for Maximum Displacement and Broad Range of High Efficiency

The present invention provides several approaches, which can be adopted alone or in combination, to achieve a larger displacement angle than was attainable in the prior art. First, a novel mechanism for displacement actuation is employed and is relocated to a point nearer the pivot point of the yoke, as compared to prior art, in order to improve the ability to reach large angles within a reasonable actuation stroke length. Second, the potential for interference among certain parts at large displacement angles is reduced by increasing the diameter of the circle on which the piston retention ball sockets lie relative to that of the circle on which the cylinder bores are arranged. Third, the retention plate is tapered and the piston connecting rods are tapered to further prevent interference of these parts. Finally, a new design for the universal joint increases its maximum bend angle without interference with other components.

Accordingly, the present invention provides a variable displacement hydraulic pump/motor including a yoke formed of a pair of shafts aligned to define a yoke pivot axis, a pair of arms having first ends located on the pivot axis and respectively fixed to the shafts. The arms extend perpendicular from the shafts to second ends where they connect with a valve plate extending therebetween. The valve plate presents a valve plate surface having intake and discharge apertures. A cylinder is mounted for rotation about a longitudinal axis with a plurality of piston cylinders formed therein in a circle centered on the longitudinal axis. Each piston cylinder is open at one end to receive the piston reciprocably mounted therein and has a cylinder opening at a second end of the cylinder barrel which presents a face mounted flush against the valve plate surface of the yoke, whereby the cylinder openings come into communication alternately with the intake and discharge apertures as the cylinder barrel rotates. A drive block is mounted on one end of an input/output shaft for rotation about a central axis of rotation which is inclined at an angle of inclination relative to the longitudinal axis of the cylinder barrel. Each of the piston cylinders has a piston mounted therein and connected to a first end of a piston rod with a second end of the piston rod pivotally connected to the drive block, the second ends forming a circular array within the drive block centered on its axis of rotation. The yoke can be pivoted to change the angle of inclination by means engaging at least one of the first ends of the arms. In a preferred embodiment, the drive block includes a body having sockets with socket openings at one surface and a retention plate, the retention plate having openings corresponding to and smaller than the socket openings, with balls fixed to the second ends of the piston rods retained within the sockets by the retention plate. The retention plate is thinned adjacent at least one of the plate openings so as to allow for a greater displacement angle, i.e., angle of inclination. Preferably, the circle defined by the piston cylinders in end view, centered on the longitudinal axis of the cylinder barrel, has a diameter which is smaller than the diameter of the circular array of sockets in the drive block.

(1a) Minimizing Flow and Compressibility Losses and Fluid Leakage

Leakage and other fluid related losses especially at high displacement angles can be minimized by any or all of several additional innovations. First, a novel single piece piston (the piston body does not pivot relative to the rod) with a deformable polymer seal ring is employed to reduce the potential for fluid losses past the piston that become a concern as the piston head pivot angle increases with increase in displacement angle. Second, a design referred to herein as "extreme porting" maximizes the size of the fluid ports on the cylinder barrel to accommodate the higher flow velocities associated with large displacement angles, partially enabled by minimizing the separation distance between cylinders. Finally, the pump/motor case is pressurized to a pressure equal to that of the low pressure accumulator, allowing any leakage that does occur to flow directly into the low pressure accumulator.

Accordingly, the present invention provides a variable displacement hydraulic pump/motor including a yoke formed of a pair of shafts aligned to define a yoke pivot axis and a pair of arms having first ends located on the pivot axis and respectively fixed to the shafts. The arms extend perpendicular from the shafts to second ends where they connect with a valve plate extending therebetween. The valve plate presents a valve plate surface having intake and discharge apertures. A cylinder is mounted for rotation about a longitudinal axis with a plurality of piston cylinders formed therein in a circle centered on the longitudinal axis. Each piston cylinder is open at one end to receive the piston reciprocably mounted therein and has a cylinder opening at a second end of the cylinder barrel which presents a face mounted flush against the valve plate surface of the yoke, whereby the cylinder openings come into communication alternately with the intake and discharge apertures as the cylinder barrel rotates. A drive block is mounted on one end of an input/output shaft for rotation about a central axis of rotation which is inclined at an angle of inclination relative to the longitudinal axis of the cylinder barrel. Each of the piston cylinders has a piston mounted therein and connected to a first end of a piston rod with a second end of the piston rod pivotally connected to the drive block, the second ends forming a circular array within the drive block centered on its axis of rotation. The yoke can be pivoted to change the angle of inclination by means engaging and rotating at least one of the first ends of the arms (located proximate the pivot axis).

In a preferred embodiment, the drive block includes a body having sockets with socket openings at one surface and a retention plate, the retention plate having openings corresponding to and smaller than the socket openings, with balls fixed to the second ends of the piston rods retained within the sockets by the retention plate. The retention plate is thinned adjacent at least one side of each of the plate openings so as to allow for a greater displacement angle, i.e., angle of inclination. Preferably, the circle defined by the piston cylinders, in end view centered on the longitudinal axis of the cylinder barrel, has a diameter which is smaller than the diameter of the circular array of sockets in the drive block.

Each of the cylinder openings is defined by radially inward and radially outward arcuate surfaces and generally radially extending surfaces joining the arcuate surfaces. The arcuate surfaces are spaced apart with the center of the spacing located radially outward of the central longitudinal axis of the cylinder bore with which the cylinder opening is in communication. In an end view cross-section, the radially outward arcuate surface extends circumferentially substantially beyond the cross-section of the associated cylinder bore.

As noted above, it is preferred that the structure further include the aforementioned single piece piston and that the pump motor have a hermetically sealed case to maintain lubricant therein at an elevated pressure.

(1b) Minimizing Mechanical Losses

Mechanical friction losses may be reduced by several of the features of the large angle design including (for a given displacement pump/motor) (1) reduced piston diameter, (2) reduced forces on the piston rod ball sockets, (3) reduced area of barrel to valve plate contact, and (4) reduced forces on the bearings of the input/output shaft.

In one preferred embodiment, mechanical efficiency, especially at high displacement angles, is improved by the use of novel lubrication means for the ball sockets on which the connecting rods pivot (e.g., higher than prior art case pressure). The loads acting on the yoke bushings and the bearing surface area of the yoke bushings are reduced by a novel means for balancing yoke forces that must otherwise be borne by the bushings, which has the effect of reducing the amount of friction encountered at the bushings.

Accordingly, in yet another aspect, the present invention provides a variable displacement hydraulic pump/motor including a yoke having a pair of axially aligned shafts which define a pivot axis for the yoke and a valve plate intermediate, connected to and axially offset relative to the shafts. The valve plate presents a valve plate surface having a pair of arc-shaped intake and discharge apertures. A radial port is formed in each of the shafts in communication with a fluid passage internal to the yoke and communicating with one of the arc-shaped apertures, whereby fluid flows through the radial ports perpendicularly to the pivot axis. As described above, the pump/motor further includes a cylinder barrel rotatable about a longitudinal axis and having a plurality of piston cylinders formed therein in a circle centered on its longitudinal axis. Each piston cylinder is open at one end of the cylinder barrel to receive a piston reciprocably mounted therein and opens at a second end of the cylinder barrel through a fluid port. The second end of the cylinder barrel is mounted flush against the valve plate surface for intake of fluid from one arc-shaped intake aperture to a fluid port in communication with one of the piston cylinders and discharge of fluid from another of the piston cylinders through another arc-shaped discharge aperture. The pump/motor further includes a drive block and pistons respectively mounted within the piston cylinders, as described above.

The pump/motor preferably further includes a pair of O-ring seals on each of the shafts and on opposing sides of a radial port. The O-ring seals of each pair are slanted in opposite directions at an angle of approximately 5–30 degrees to a plane perpendicular to the pivot axis. These O-ring seals are mounted so that they most closely approach each other at a point opposite the valve plate end of the yoke.

(1c) Minimizing Tipping

In the preferred embodiments, prevention of tipping at high displacement angles is achieved in part by use of a flared-base cylinder barrel with a narrow bushing surface on the outside edge that increases the "lever arm" of the base of the cylinder barrel in relation to the location of the side forces exerted by the pistons reciprocating in the barrel. The design and location of the barrel post bearing may also be optimized. Either or both of these approaches increase the resistance of the barrel to resultant forces that would cause tipping. Additionally, the fluid ports on the base of the flared cylinder barrel may be relocated slightly outward toward the outer circumference of the cylinders to increase the normal fluid reaction forces at the ports which oppose the piston side forces, further resolving the forces that lead to tipping.

Accordingly, in another aspect the present invention provides a yoke including a pair of shafts, aligned to define a yoke pivot axis, a pair of arms having first ends respectively fixed to said shafts and a valve plate, having intake and discharge apertures, connected to and extending between second ends of the arms. A cylinder barrel has one end flared to an end face larger than an end face (unflared) at the opposite end of the barrel. The cylinder barrel is mounted for rotation about a longitudinal axis and has a plurality of piston cylinders formed therein in a circle centered on the longitudinal axis. Each cylinder is open at the opposite end to receive a piston reciprocably mounted therein and has a fluid port at the one end, whereby the cylinder openings come into communication alternately with the intake and discharge apertures as the cylinder rotates. The one end face has a raised (axially extending) outer annular ridge on or adjacent its outer periphery and a raised (axially extending) inner annular grid surrounding and isolating each of the cylinder openings. The outer annular ridge and the inner annular grid, radially spaced from the outer annular ridge, seal against the valve plate. Of course, the raised sealing surfaces could be located on the valve plate with the barrel having a flat surface face to achieve an equivalent effect. A drive block and piston rods, as previously described, connect with the cylinder barrel.

(2) Quantity Production

Production cost in large quantities is improved by a number of features of the various preferred embodiments. The integration of several conventionally separate parts into the yoke is a primary feature of one preferred embodiment. Also, a simplified piston and rod ball design reduces the complexity of the pistons and rods, and may be adopted to further reduce manufacturing cost. Additionally, in other preferred embodiments, a new universal drive joint mechanism (as well as improvement of the basic tripode configuration) reduces manufacturing cost due to easier assembly and fewer parts. Finally, in yet another preferred embodiment, the pressurized case reduces manufacturing cost by eliminating the need for a separate charge pump and holding tank.

(3) Minimum Weight and Volume

A number of the innovations mentioned above lead to a reduction in weight and volume. However, the weight and volume of the device may be further reduced by any or all of several additional innovations. First, by introducing fluid flow into the yoke through radial ports rather than end ports, the rigidity of the yoke assembly may be reduced because the forces created by the radial flow into and out of the yoke are more easily resolved and so do not impose as great a distortive force on the yoke. As a result, less material need be used in construction of the yoke, leading to smaller volume and less weight. Second, the use of a hollow drive shaft instead of the conventional solid shaft further reduces the weight of the device. Third, a slanted O-ring design (discussed later) indirectly reduces weight and volume by reducing the necessary size and weight of the yoke bushings. Finally, the pressurized case reduces weight and volume by eliminating the need for a separate charge pump and holding tank.

The invention provides significant advantages over prior art pump/motors, particularly in their use in hybrid powertrains for automobiles, but also in many other applications. First, the invention allows the achievement of larger displacements angles and a larger range of variable displacements angles than are seen in any prior art designs, by removing many of the geometric and performance factors that limit bend angle in prior art designs. Second, the invention sustains a high efficiency over a wider range of displacements and speeds than previous designs, particularly by minimizing flow and compressibility losses, minimizing mechanical losses, and minimizing the chance of tipping. Third, the invention improves the ability to achieve quantity production at lower cost by incorporating several cost and complexity reducing concepts. Finally, the invention provides a bent-axis pump/motor having lower weight and smaller volume than that of prior art designs.

In preferred embodiments an improved tripod design provides a spherical bearing surface in place of separate guidance pins, reducing difficulty of assembly and manufacturing cost while allowing larger angles than previous designs. An alternative embodiment ball-disc flexible barrel drive shaft represents a further improvement in this regard. The outer portion of the retention plate is thinner than the inner portion in order to prevent interference with the barrel at large displacement angles, and the inner portion of the retention plate is more narrow then the outer portion in order to prevent interference with the piston connecting rods and ball joints at large displacement angles. Preferably, the porting arrangement provides greater flow area in the cylinder ports at large angles.

In other preferred embodiments high efficiency at large angles and across a wide range of angles and speeds is achieved by (1) the use of a single piece piston with rigidly connected head and deformable polymer ring which provides a more reliable sealing surface than previous designs at a low manufacturing cost and (2) the use of a pressurized case to improve lubrication of the ball and socket area and to allow leakage to flow directly into the low pressure accumulator.

Mechanical efficiency at all angles is also improved by the improved pressurized case lubrication of the ball sockets on the drive plate. Further, a reduced yoke pin bushing size may be adopted to reduce friction in a new yoke design which involves radial porting and slanted O-rings for improved force resolution.

Tipping may be further reduced by biasing of cylinder ports to the outer edge of the cylinder to improve force resolution and by adding to the barrel a flared-base with an outer edge anti-tipping bushing.

Further reductions in manufacturing cost in large quantity production can be achieved by the integration of the back plate, yoke pins, actuator pinion, and the single-piece cast construction of the yoke. Also, the drive shaft bearing race is preferably integrated directly into the drive shaft. Finally, the new tripode and ball-disc designs previously mentioned also serve to reduce cost.

Reduced weight and greater compactness are provided by the preferred radial arrangement of yoke fluid ports, in contrast to the end porting arrangement known in previous designs. The improved resolution of forces that results, reduces the potential for distortion of the yoke during operation, allowing for smaller and lighter construction. The use of a hollow drive shaft serves to further reduce weight of the pump/motor.

BRIEF DESCRIPTION OF THE DRAWINGS

FIG. 6 is a sectional view of a prior art piston;

FIG. 7 is a sectional view of a prior art piston at an angle within its associated cylinder as is commonly encountered during pump/motor operation;

FIG. 8 is a sectional view of another prior art piston, also at an angle within its associated cylinder common in operation;

FIG. 9 is a sectional view of a new single-piece piston in accordance with the present invention;

FIG. 10 is a sectional view of the piston of FIG. 9 shown at an angle within its associated cylinder;

FIG. 11 is a sectional view of a prior art tripode assembly;

FIG. 12 is a sectional view of a tripode assembly in accordance with the present invention;

DESCRIPTION OF THE PREFERRED EMBODIMENTS

Figure 1:
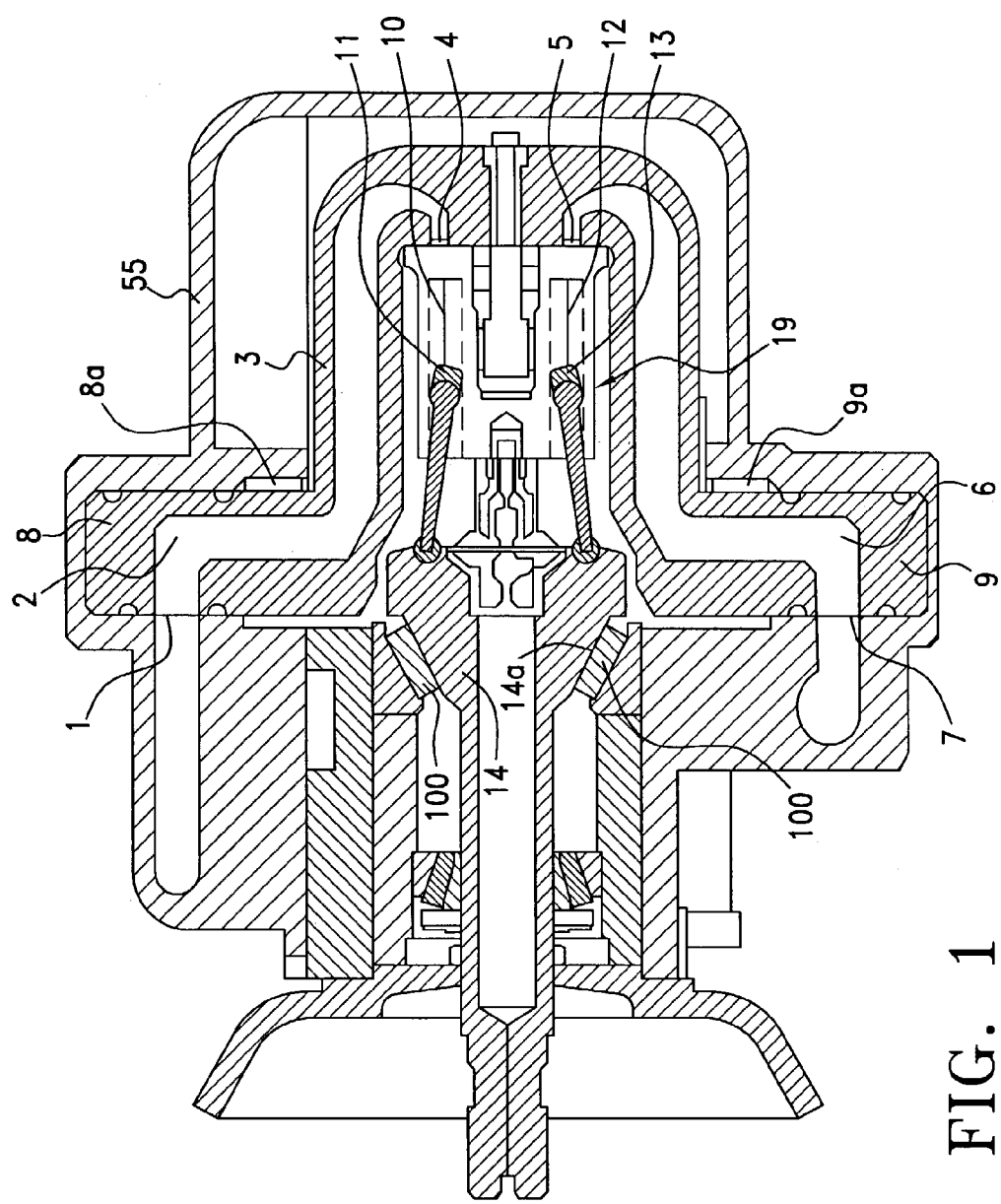
FIG. 1 is a cross-sectional view of a first preferred embodiment of the hydraulic pump/motor of the invention.

First, the basic operation of the invention shall be described by following the flow of fluid through a representative embodiment of the invention depicted in FIG. 1 operating as a motor.

Referring to FIG. 1, fluid at a high pressure enters at yoke radial port 1 and passes through fluid passage 2 within pivotable yoke 3. Both fluid passages 2 and 6 are preferably of constant cross sectional area. The fluid then enters the valve plate port 4 at which point it begins to participate in a work producing cycle. In this cycle, high pressure fluid entering cylinder 10 pushes reciprocating piston 11 downward which exerts a force on driveshaft (input/output shaft) 14 causing it to rotate. About half of the additional pistons (not shown) will also be participating in various stages of their power stroke at any given time. Simultaneously, piston 13 is taking part in an expelling stroke (shared by the remaining pistons), traveling upward in cylinder 12 acting to expel the now low pressure fluid from cylinder 12. This fluid exits through the opposite valve plate port 5, through fluid passage 6 and through yoke radial port 7 proceeding to a low pressure fluid reservoir.

Figure 2:
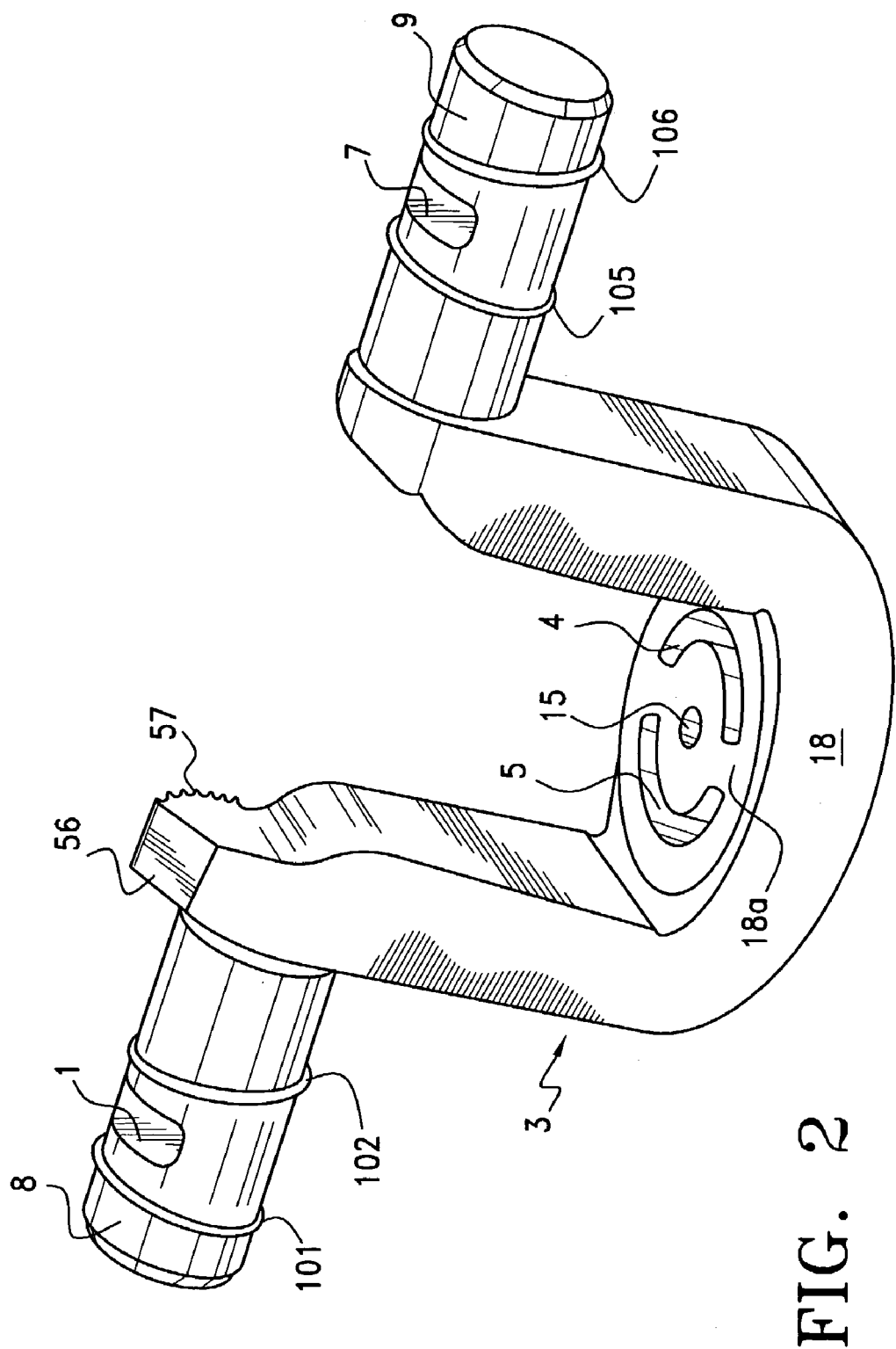
FIG. 2 is a perspective view of the yoke of the embodiment of FIG. 1 showing the integrated valve plate, integrated yoke pins, and integrated actuator teeth which represent one example of means for yoke angle adjustment.

FIG. 2 provides a clearer view of the ports of the yoke. The semicircular shape of valve plate ports 4 and 5 and the radial position of yoke radial ports 1 and 7 can be seen clearly. Valve plate surface 18a provides a smooth lubricated surface on which the cylinder barrel (not shown) rotates and receives and discharges fluid from and to the yoke passages. A hold down device (not shown) is anchored in retention hole 15 and rotatably clamps the cylinder barrel 19 (FIG. 1) to the valve plate surface 18a.

Figure 4:
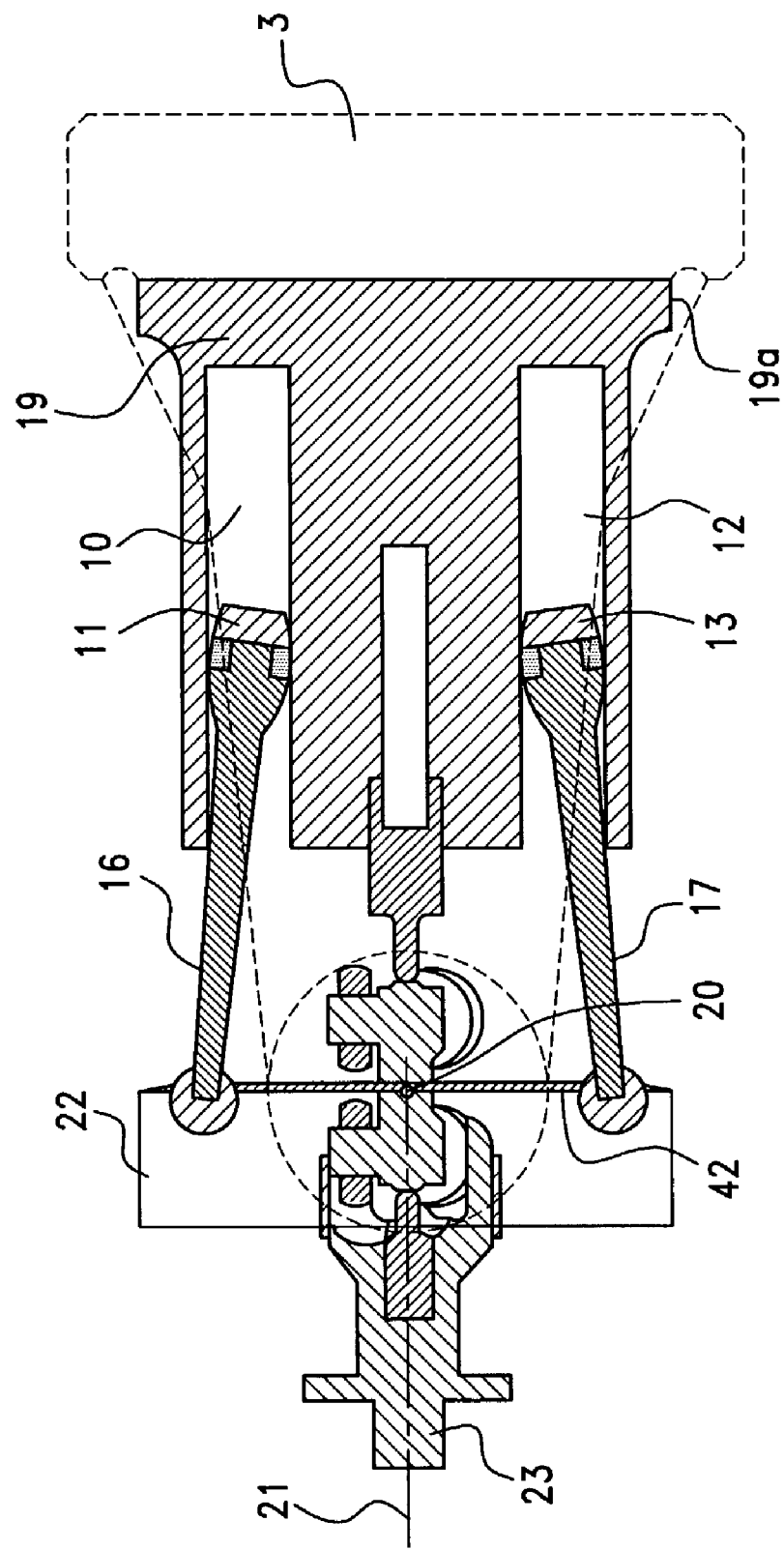
FIG. 4 is a sectional view of the drive mechanism of the first preferred embodiment of the present invention in a position of zero displacement showing the cylinder barrel, two representative pistons, a portion of the tripode (the specific universal drive joint mechanism), and the drive block.
Figure 5:
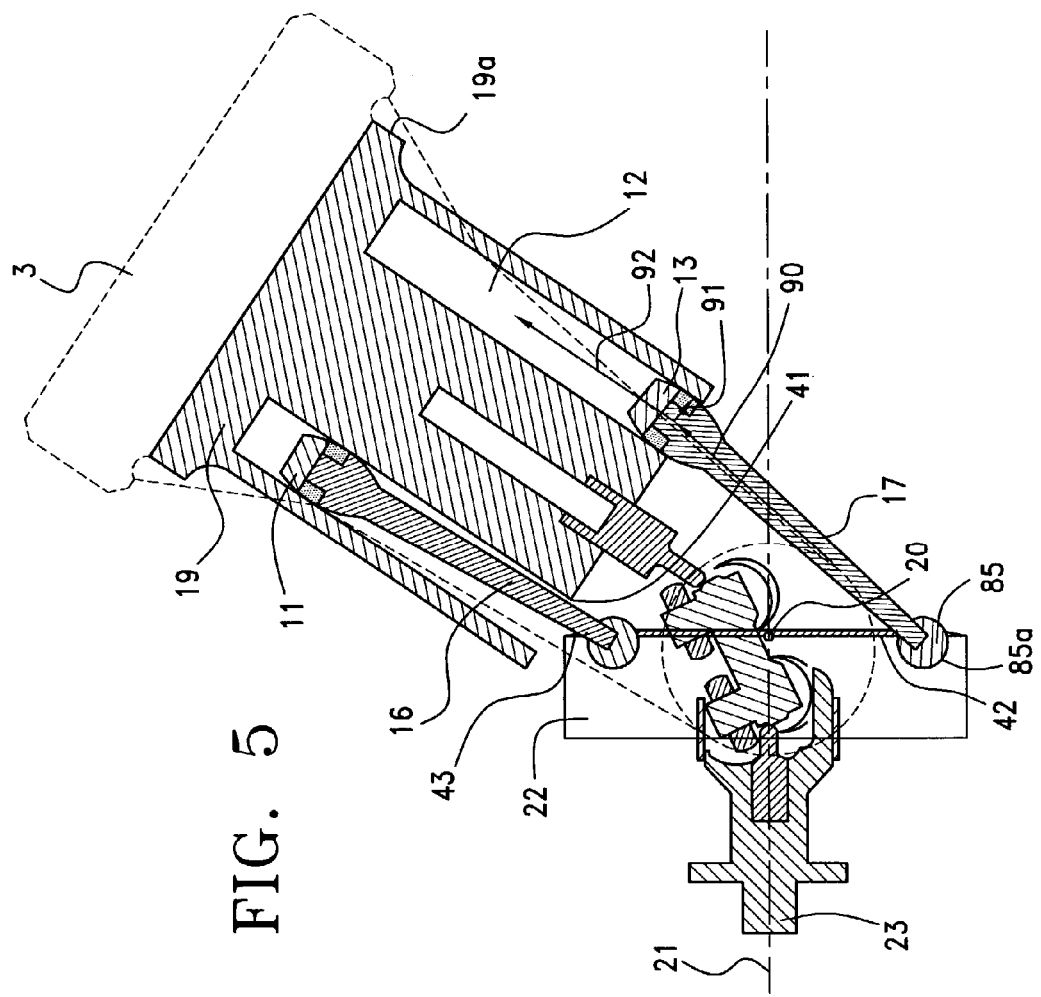
FIG. 5 is a sectional view of the same components shown in FIG. 4 at maximum displacement.

Referring again to FIG. 1, yoke 3 can be pivoted about the axis of yoke pins 8 and 9 to achieve variable displacement. The mechanism by which this pivoting affects displacement is visible more clearly in FIGS. 4 and 5 which show cylinder barrel 19 housed rotatably within the cradle of yoke 3 viewed in line with pivot point 20 of yoke pins 8 and 9. In FIG. 4, yoke 3 is in a zero displacement position in which it cradles the cylinder barrel 19 in a position parallel to the rotation axis 21 of drive block 22. If the cylinder barrel 19 and drive block 22 were now to be rotated together, pistons 11 and 13 as well as the other pistons (not shown) would travel with them but remain stationary within their respective cylinders. In FIG. 5, yoke 3 has now moved to a maximum displacement position in which it now cradles cylinder barrel 19 at an acute angle to rotation axis 21 of drive block 22. Now, if cylinder barrel 19 and drive block 22 were to be rotated about their respective axes, the pistons 11 and 13 as well as the other pistons (not shown) would be forced to reciprocate within their respective cylinders owing to the variation in distance between the surfaces of cylinder barrel 19 and drive block 22 as the assembly rotates.

(1) Large Angle for Maximum Displacement and Broad Range of High Efficiency

Figure 3:
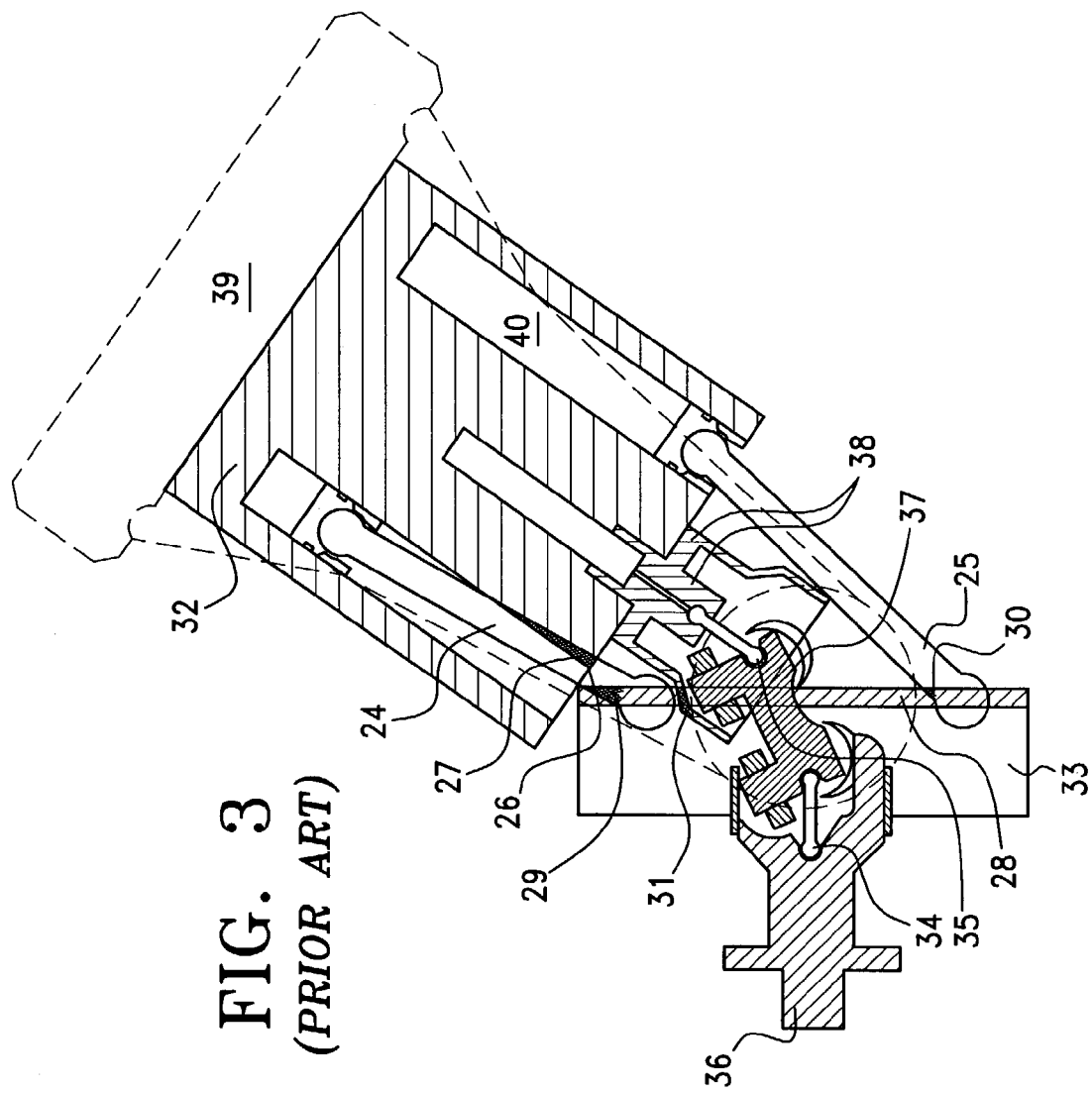
FIG. 3 is a cross-sectional view of the major components of a prior art bent axis hydraulic pump/motor, extended to an extreme angle to illustrate geometric limits encountered by such devices.

Some of the limits of the prior art encountered in achieving a large angle can be understood by referring to FIG. 3 which illustrates a prior art pump/motor (of the preferred yoke design) extended to an extreme angle. It can be seen that connecting rod 24 interferes with cylinder bottom edge 26 resulting in a zone of interference 27. Similarly, there is interference between retention plate 28 and connecting rods 24 and 25 illustrated by zones of interference 29 and 30. Additionally, zone of interference 31 shows interference of barrel connector 38 with drive block 33. Finally, tripode guidance pins 34 and 35 are at an extreme angle and in this state may wander or fall out. Guidance pins 34 and 35 serve to guide and center the relative movement among drive block member 36, central member 37 and cylinder barrel 32.

The present invention eliminates the above and other problems described previously by means of several innovations. FIG. 5 shows the first embodiment of the invention extended to the same extreme angle as the prior art device of FIG. 3. The tapered design visible in connecting rods 16 and 17 eliminates interference between connecting rods and cylinder bottom edges (yet is still strong enough to prevent rod buckling), as illustrated by the lack of interference between connecting rod 16 and cylinder bottom edge 41. The tapered design also eliminates interference between connecting rods and the retention plate as illustrated by the lack of interference between connecting rod 17 and the inner edge of retention plate 42. Also, the tapering of the outer edge 43 of retention plate 42 prevents interference at the outer edge of the plate as indicated by the lack of interference with connecting rod 16. Optionally, the tapering of outer edge 43 of retention plate 42 could extend to both sides of the ball socket interface to reduce the potential for interference even more on both sides of the ball joints. FIG. 4 shows clearly the optimum diameters of the centers of the ball socket ends of the rods 16 and 17 relative to the barrel 19 cylinders 10 and 12, i.e., the diameter of a circle around which the piston cylinders are arranged in an end view of the barrel is smaller than the diameter of the circular array of ball sockets in retention plate 42.

The problem posed by the tripode guidance pins is alleviated by an improved tripode design which eliminates guidance pins. The prior art tripode design is illustrated in FIG. 11 in contrast to that of the present invention shown in FIG. 12. In the improved design, guidance pin 46 (FIG. 11) has become guidance member 49 (FIG. 12) which is fixed to drive member 23 and slides along spherical surface 52 at the left end of central member 51. Also, guidance pin 47 (FIG. 11) has become integrated with barrel connector member 50 (FIG. 12) and slides along spherical surface 53 of central member 51. In this embodiment, the now integrated guidance pins no longer can misalign or fall out at extreme angles, yet they continue to provide effective guidance by sliding upon the spherical surfaces of the central member 51.

A large displacement angle is further enabled by an improvement in the yoke pivot actuation means. Referring to FIG. 2, a yoke actuation pinion 56 having a gear sector 57 is located near the pivot axis of yoke pins 8 and 9. Yoke pivot is achieved by the control of pinion 56 by a linear toothed rack within an actuator mechanism (not shown). The relocation r of the actuation mechanism to a point near the yoke pivot achieves a greater angle of pivot per unit length of actuation stroke than is possible by actuation mechanisms that act near the outer arc of the yoke pivot. In an alternate embodiment, actuation may be achieved by one or more similarly located hydraulic cylinder actuators in place of the illustrated gear sector 57 and rack.

(1a) Minimizing Flow and Compressibility Losses and Fluid Leakage

The problem of leakage associated with large piston wobble angles (for one piece piston/rod designs) is largely dependent on piston design. FIG. 6 illustrates one prior art piston design preferred for use in the present invention. In the prior art design shown in FIG. 6, piston 60 includes a piston head 61 with a number of metallic or polymer sealing rings 62a and 62b and a ball socket 63 which receives a rounded end 64a (FIG. 7) of a piston rod 64 secured by a snap ring 65. FIG. 7 depicts the piston 60 of FIG. 6 at an angle within a representative cylinder 67. When the piston 60 is traveling upward within cylinder 67 under the influence of compressive force 66, then a side force 68 is exerted on the inner wall of the cylinder 67 primarily at leading edge 69 of piston 60. There is a tendency for leading edge 69 to generate friction when rubbing against the cylinder wall under influence of this side force 68, leading to mechanical losses, increased wear, and leakage over time. In additional, the small ball end 64a (small because of the need to fit within the piston 60) experiences extremely high loads (since the entire force acting on the piston 60 must be transmitted through this interface) and is prone to excessive wear and/or galling failure.

FIG. 8 shows another prior art piston 70 suitable for use in the present invention A rigidly attached piston head 71 has a plurality of metallic rings 72 that somewhat loosely encircle the piston head 71. The round edge (spherical shape) of piston 70 serves to prevent binding and reduce wear on the cylinder wall 73. Because the piston 70 is integral with the connecting rod 74, when the connecting rod 74 is at an angle with respect to the cylinder wall 73, piston 70 is also tilted within the cylinder 73, meaning that the interface between the piston 70 and cylinder wall 73 becomes elliptical, making it more difficult to seal. The metallic rings 72 provide a degree of sealing because they are free to slide a limited distance off the centerline of the piston 70, so as to maintain an approximate seal between the piston and the elliptical cylinder cross section. As a result, a relatively high leakage does occur, albeit less than would occur without the rings 72.

FIG. 9 illustrates a new "single piece" piston 80 preferable design employed in the present invention, in preference to the prior art types of FIGS. 6, 7 and 8. The term "single piece" as used herein refers to the rigid connection of the piston head to the connecting rod and not necessarily to a true single piece or "integral" construction. Rigidly attached piston head portion 81*a* surmounts rod end 83*a* of a tapered connecting rod 83 and a deformable polymer ring 82. Piston head 81 consists of head portion 81*a* and rod end 83*a* and becomes spherical in shape, i.e., forms a spherical section, as it approaches ring 82 to provide low friction back-up support for ring 82 in reacting against piston side forces. Connecting rod 83 is united with ball joint 85 which is preferably a standard ball bearing. The polymer ring 82 has a spherical outer profile so as to continue providing a complete seal with the cylinder cross section even as the piston tilts through various angles. The polymer ring 82 is slightly deformable so as to insure a complete seal without the need for multiple rings and to compensate for any cylinder wear that may occur over time. The polymer ring 82 is approximately bisected by a plane 82*a* passing through the spherical center of piston head 81. By these means the new piston design provides improved sealing at the wide wobble angles characteristic of a large angle device. FIG. 10 shows the improved piston of FIG. 9 at maximum angle within the cylinder.

Figure 14:
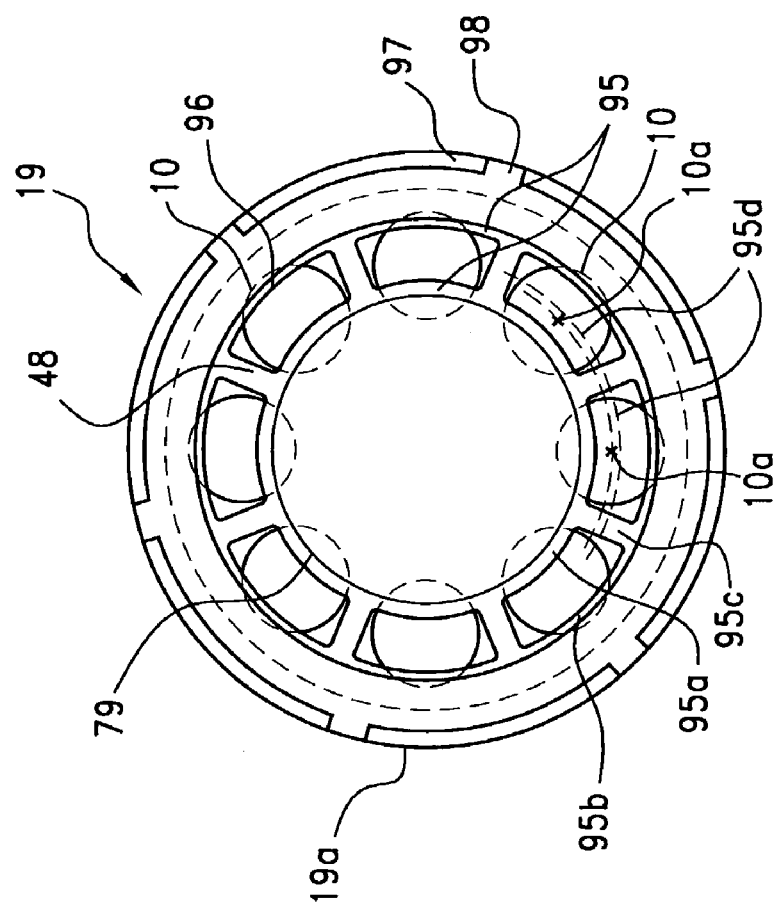
FIG. 14 illustrates a cylinder port arrangement provided by a novel cylinder barrel in accordance with a preferred embodiment of the present invention.
Figure 13:
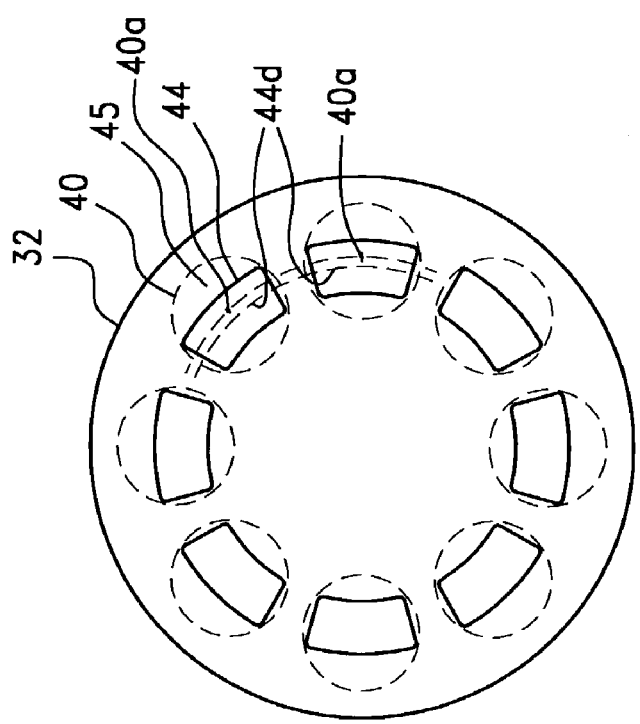
FIG. 13 illustrates a prior art cylinder port arrangement.

The need to accommodate high fluid flow rates at large displacements and high speeds is provided by the enlargement of the ports in the cylinder barrel. FIG. 13 shows a view of the port surface of a prior art cylinder barrel 32 where the cylinder barrel mates with the valve plate 39 (FIG. 3) of the yoke. Cylinder bores 40 receive and discharge fluid through ports 44 to valve plate 39. The new design is depicted in FIG. 14. In order to accommodate larger fluid flows, ports 96 are increased in cross sectional area as much as possible, compared to ports 44 of FIG. 13, by increasing their radial dimension as well as their transverse dimension, with the ultimate limit to the transverse dimension being the minimum allowable thickness of web 48.

(1b) Minimizing Mechanical Losses

Mechanical losses are minimized by reducing friction in the ball socket interface between the ball joints 85 and the drive block ball sockets 85*a* and retention plate 42 (FIG. 5), in addition to the friction reductions features associated inherently with the large angle design. The pressurized case feature of the invention, up to 200 psi, provides increased lubrication to the ball and ball socket interfaces.

Mechanical losses attributable to pivoting of the yoke are also reduced by a reduction in the load necessary to be carried by the yoke bushings/bearings 8*a*, 9*a*, (FIG. 1). The innovation by which this is achieved is closely related to another innovation more directly related to reduction of weight and volume, and therefore it will be detailed more completely in that section. The nature of this innovation may be understood by referring to FIG. 2. In an assembled state, O-rings 101, 102, 105 and 106 provide sealing of fluid ports 1 and 7 and so the space between them is normally filled with a thin layer of pressurized fluid that exerts a force on the yoke pin joints and their bearing surface commensurate with the pressure of the fluid and the area of contact. It can be seen that these rings are slanted, in opposite directions, at an angle of up to 30° to a plane perpendicular to the axis of yoke pins ("shafts") 8 and 9, rather than concentric with the yoke pins, and as a result the width of the sealed juncture is not constant. Because of this, the resultant force exerted on the interface by the interstitial fluid varies with fluid pressure. The angle at which O-rings 101, 102, 105 and 106 are inclined is calculated to provide a hydrostatic counterbalancing force that matches the varying need for resolution of fluid reaction forces acting on the yoke to provide piston force, and the resultant radial forces that must be carried by the yoke bearing/bushings. This innovation reduces the maximum load experienced by the yoke bushings 8*a*, 9*a* (FIG. 1), thereby reducing the friction of the bushings by (a) reducing the necessary size and hence bearing area of the bushings and (b) reducing the amount of load held by and hence the force acting upon the bearing area of the bushings. Furthermore, the radial position of ports 1 and 7 leads to a reduction in weight of the yoke (as detailed later), which reduces the inertia of the yoke as it is pivoted to varying angles. This reduces the energy that must be expended toward the adjustment of displacement.

(1c) Minimizing Tipping

Prevention of tipping at high displacement angles is achieved in part by use of a flared-base cylinder barrel with an outer edge anti-tipping bushing. Referring to FIG. 5, it can be seen that cylinder barrel 19 has flared bottom edge 19*a* which provides a wider base than the prior art cylinder barrel 32 of FIG. 3. The flared base bottom edge 19*a* provides additional resistance to piston side forces that could cause tipping. For example, referring again to FIG. 5, when piston 13 travels upward in cylinder 12 under influence of compressive force 90, compressive force 90 resolves into pumping force 92 and a side force 91 (not to scale) which acts on the cylinder barrel. If the resultant of all side forces exerted on all cylinders by all pistons at a given time is of sufficient distance from the base 19*a* of cylinder barrel 19 and of sufficient magnitude, cylinder barrel 19 may become momentarily unseated from valve plate surface 18*a* (FIG. 2), causing fluid to leak from this interface. The wider base provided by flared bottom edge 19*a* increases the moment required to unseat cylinder barrel 19 by side forces and makes tipping less likely than in conventional designs. However, if the entire increased area of cylinder barrel base 19*a* (FIGS. 4 and 5), as compared to the base of cylinder barrel 32 (FIGS. 3 and 13), were in contact with the yoke valve plate surface 18*a*, lower sealing pressures around the fluid ports ("cylinder openings") would result, and leakage across the larger area would exert greater separation forces. Accordingly, as shown in FIG. 14, the preferred cylinder barrel 19 has raised area 95 ("grid") around the cylinder ports 96 to provide high pressure sealing and peripheral raised areas 97 on the outer edge 19*a* of the barrel 19, spaced radially outward from raised area 95, to provide an anti-tipping contact bushing. Raised area or grid 95 is formed of radially inward arcuate surface 95*a* and radially outward arcuate surface 95*b* which define a centerline 95*d* radially outward of the central, longitudinal axis 10*a* of piston cylinder 10, in contrast to the prior art of FIG. 13 wherein the centerline 44*d* of each arcuate cylinder opening port 44 is slightly radially inward of central longitudinal axis 40*a* of piston cylinder 40. Also the section of radially outward arcuate surface 95*b* (FIG. 14), which partially defines a cylinder opening port 96 for a single cylinder, extends circumferentially substantially beyond the cross-section of the associated cylinder 10, again in contrast to the prior art of FIG. 13 wherein the cylinder opening port 44, when completely uncovered, is wholly within the cross-section of the associated cylinder 40. Separations or gaps 98 between raised peripheral areas 97 allow any leakage through sealing area 95 to escape to the case without exerting an additional separation force.

An additional change in the cylinder port design intended to further prevent tipping by improving the resolution of side forces, is shown in FIG. 14. Referring to FIG. 13, conventional cylinder barrel 32 having fluid ports 44 which conduct fluid into and out of cylinders 40. In normal operation, fluid pressure within cylinder 40 acts on that area 45 remaining at the end of cylinder 40 not open at port 44 and creates a force that acts on the cylinder barrel 32 at the point of cylinder 40 that is the center of the remaining area 45. This force acts to counteract some portion of any side force simultaneously being exerted by a piston on the cylinder 40. In typical prior art designs as depicted in FIG. 13, cylinder ports 44 are not centered on the cylinder bores 40 but, rather, are located slightly inward of the center of the cylinder bores. FIG. 14 depicts a new port design in which ports 96, as noted above, are located further out toward cylinder barrel outer edge 19a, as compared to ports 44 in the prior art design of FIG. 13. As a result, the fluid forces created within cylinder 10 (and all others) are in a better position to counteract piston side forces being exerted on cylinder 10 (and all others) and hence cylinder barrel 19 is less prone to tipping. The resultant force within cylinder 10 would also be at the center of the remaining area 79.

(2) Manufacture

Several innovations improve the manufacturing process and lower production costs as compared with the conventional pump/motor designs.

Referring to FIG. 1, an array of roller bearings 100 rotatably support drive shaft 14. Conventionally, the bearing surface of drive shaft 14 would be provided by a race that is manufactured as a separate part and assembled to drive shaft 14 as part of the assembly process. In the invention, it can be seen that drive shaft 14 does not have a separate race but instead has a bearing surface 14a machined directly into the shaft surface, eliminating the need to manufacture and assemble a separate race.

Similarly, the yoke has been designed to allow the integration of several parts that were previously manufactured separately and then assembled. Referring to FIG. 2, it can be seen that the yoke 3 is constructed in a single piece, preferably by a casting and machining process, rather than as multiple pieces as is more conventionally done. Yoke pins 8 and 9 are integrated with the yoke, being provided with a proper bearing surface by a machining process. The valve plate surface 18a of back plate/valve plate 18 is also machined directly into the yoke surface to eliminate the need for a traditionally separate part. Similarly, actuator pinion gear 56 is also integrated with the yoke. Pinion teeth ("gear sector") 57 are machined directly into the yoke and locally hardened.

The relatively large number of pistons that exist in a single pump/motor (as many as seven to nine or more) suggests that labor-intensive operations such as machining should be reduced for this part as much as possible. Referring again to FIG. 9, connecting rod ball joint 85 is fashioned from a standard ball bearing and attached to piston 80 preferably by friction welding or by a simple threaded connection, in contrast to the conventional practice of precision machining the ball as an integral part of the connecting rod piece.

The improved tripode design discussed previously and depicted in FIG. 12 further reduces the cost of manufacture by eliminating guidance pins 46 and 47 of FIG. 11, which significantly reduces the difficulty of assembly of the tripode.

A pressurized (hermetically sealed) case reduces manufacturing cost by eliminating the need for a separate charge pump and holding tank. Referring to FIG. 1, case 55 is maintained at a pressure equal to that of the low pressure accumulator (not shown) that receives low pressure fluid (typically up to 200 psi) after it has been used in a power producing cycle. In conventional designs, fluid that leaks into the case resides in a very low pressure reservoir (or holding tank) that is maintained near atmospheric pressure, and a separate charge pump is required to recharge this fluid to the low pressure accumulator. By providing a case pressure that is equal to that of the low pressure accumulator (on the order of 200 psi), the charge pump and holding tank are eliminated leading to further cost savings.

(3) Yoke Radial Ports

Referring again to FIG. 1, the flow of fluid into and out of yoke 3 is achieved through radial ports 1 and 7 through which fluid flows in and out perpendicularly to the pivot axis of the yoke, rather than parallel to it at its ends (i.e., axial) as known in the prior art. The advantages of a radial yoke port design over an end porting arrangement can be understood by considering the forces exerted on the yoke 3 and the cylinder barrel 19 during a typical cycle. In an end ported design, as high pressure fluid enters one end of the yoke, the fluid exerts a force on the end of the yoke commensurate with the pressure of the fluid and as a result tends to squeeze the yoke inward. To effectively counteract this distortive force, the yoke must be of very strong and heavy construction, adding to the overall weight of the device. In contrast, the fluid forces exerted on a yoke having radial ports will act in a direction perpendicular to the rotation axis of the yoke, which allows the fluid force to be opposed by bearings about which the yoke pivots, reducing the distortive phenomenon and reducing the need for as strong and heavy a construction for the yoke.

Figure 15:
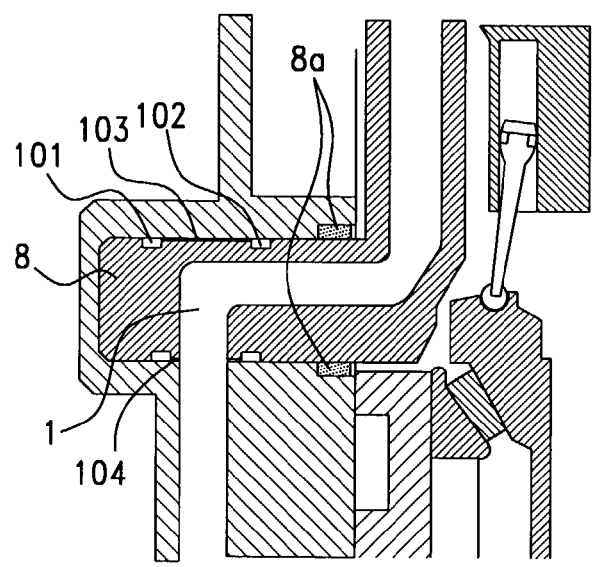
FIG. 15 details the slanted O-ring system of the yoke pins of a preferred embodiment which provides hydrostatic balancing force to the yoke assembly.

Furthermore, radial porting provides an opportunity to further balance the forces acting on the yoke so that a much smaller bushing with a lighter load rating may be used (although this can also be utilized with axial porting), additionally reducing the weight of the device. FIG. 15 details, the mechanism by which this balancing is accomplished. O-rings 101 and 102 (or other seals) seal radial port 1 in yoke pin 8, creating a film of pressurized fluid in interstitial spaces.103 and 104. Because O-rings 101 and 102 are slanted at a specific angle, with the area of interstitial space 103 being appropriately greater than the area of the interstitial space 104, there is a greater force acting on the yoke pin 8 from space 103 than space 104. As the yoke 3 pivots through different displacement angles the direction of the net force follows the direction of the force from the yoke to be reacted at the pins, since the O-rings move with the yoke pin. Since the fluid existing in the space between the O-rings is always of the same pressure as the fluid entering or exiting the yoke radial ports 1 and 7, the difference in area results in a resultant force being exerted on the yoke 3 which varies in accordance with the amount of force being experienced by the yoke. As a result, the magnitude of force that must be resisted by the bushing/bearings 8a is smaller (depending on the relative areas of space 103 and space 104) and so the bushing can have a smaller load rating, allowing for use of a smaller and lighter bushing.

Referring to FIG. 1, it can be seen that driveshaft 14 is of hollow construction, reducing its weight compared to the conventional solid shaft design. As noted above, the pressurized case 55 allows for a further reduction in weight and volume by eliminating the need for a separate charge pump.

Many other modifications and embodiments of the present invention will become apparent to those skilled in the art from a reading of this specification.

For example, in other embodiments, the single-piece piston design of FIGS. 9 and 10 may be replaced by a prior art piston design such as that depicted in FIG. 7 or 8.

Further, while the embodiments described above illustrate the present invention in the context of a single-sided variable displacement pump/motor, which varies in angle from a zero displacement position (zero degrees) to a large positive displacement angle (such as 54 degrees) the invention can equally well be embodied in a over-center design, in which the bend angle may extend on both sides of a zero displacement position, for example, from positive 54 degrees to negative 54 degrees.

Figures 16, 17:
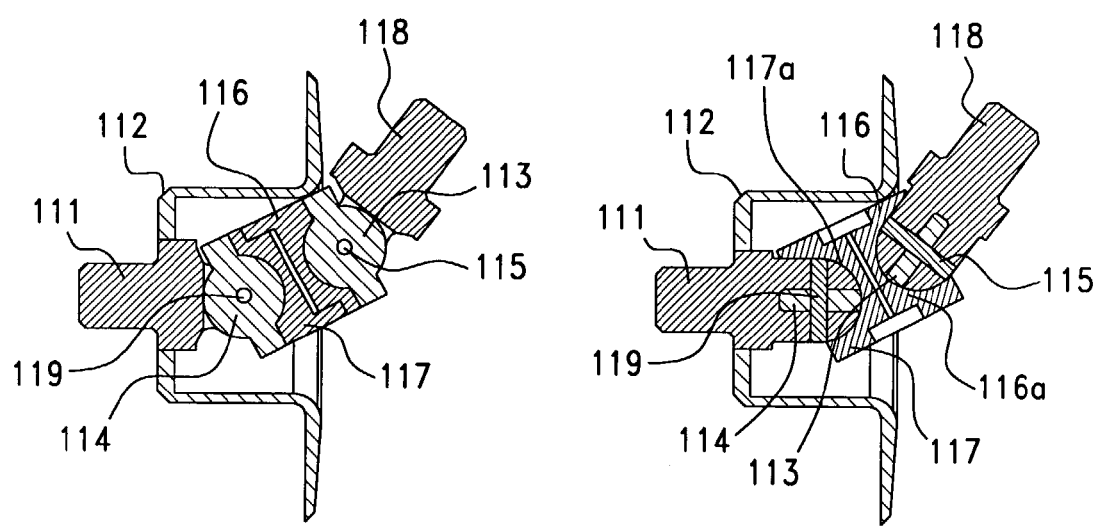
FIG. 16 is a sectional view of an embodiment of the universal joint barrel drive-shaft, the "ball-disc" design in accordance with the present invention.
FIG. 17 is another sectional view of the universal-joint barrel drive shaft of FIG. 16.

FIGS. 16 and 17 illustrate an alternate embodiment universal joint shaft of the tripode of FIG. 12. FIGS. 16 and 17 present two orthogonal section views of the flexible drive shaft, "ball-disc" design at its maximum bend angle, in this case an angle of about 54 degrees. Referring to FIG. 16, drive block ball head shaft 111 rotates within casing 112 which is inset within the end of the drive shaft (not shown). Drive block ball head shaft 111 articulately joins with cylinder barrel head shaft 118 by means of intervening parts 113-117 and 119. The intervening parts forming the articulating joint are torque discs 113 and 114, coupling halves 116 and 117, and retaining pins 119 and 115. In the bending mode depicted in FIG. 16, torque disc 114 has pivoted on retaining pin 119 as has torque disc 113 on retaining pin 115. As cylinder block ball head shaft 118 rotates under power from the drive shaft (not shown), transferred first to drive block ball head shaft 111, the torque disc 114 receives the bulk of the torque load and transmits it to coupling half 117, which in turn transmits it to coupling half 116, torque disc 113, and cylinder block ball head shaft 118. Referring to FIG. 17, it will be seen that this ball-disc joint design is universal in that it can accommodate bend angles in the orthogonal plane and in any arbitrary plane as well. Here, the bend capability has been provided by the pivot of cylinder block ball head shaft 118 within the semicircular recess 116a of coupling half 116, and the similar pivot of coupling half 117 about the semicircular ball head surface 117a of drive block ball head shaft 111. Each of coupling halves 116 and 117 has a cup-shaped socket at one end and a plurality of sectors similar to those shown as sectors 137 in the embodiment of FIGS. 22–26.

The advantages of the improved, flexible drive shaft design of FIGS. 16 and 17 include reduction in parts count, improved assemblability, improved velocity matching, and improved torque carrying capacity. In considering tripode and other flexible drive shaft designs of the prior art, these advantages become obvious. For example, with the tripode design as depicted in FIG. 11, typically 18 parts (consisting of 8 distinct parts) must be manufactured and assembled. Due to poor access to pin locations and to the connecting parts to which the joint assembly must mate, the 18 parts will not easily stay together as an assembly when outside of the pump and thus are difficult to place into a pump assembly. In contrast, the design of FIGS. 16 and 17 consists of a total of only 8 parts, of which 4 are distinct, and will stay together as two halves when assembled outside of the pump, and so greatly reduce the difficulty of assembly as well as the cost of manufacture.

The simplicity and ruggedness of the joint parts 111–119 of FIGS. 16–17 improve the torque load capacity over the prior art designs. In particular, the prior art embodied in the tripod shown in FIG. 11 relies on relatively small legs 37a of the central member 37 to transmit torque from the central member 37 through the roller 86 and on to the drive block member 36. In addition, torque transfer from roller 86 to drive block member 36 is performed by way of line contact, which increases stress and reduces durability. In contrast, all toque in the embodiment shown in FIGS. 16–17 is transmitted by way of area contact, which decreases stress and increases durability. Moreover, the simple compact design of this embodiment increases the torque-carrying capacity of all parts and results in a joint assembly having a smaller packaging envelope for the same torque capacity, allowing this joint to be fit into the relatively constrained space available in high-angle pump/motors.

In addition, unlike the prior art, the joint in FIGS. 16–17 contains coupling halves 116 and 177 which are allowed to slide axially in relation to each other. The sliding motion maintains strict symmetry of the joint, which allows perfect velocity matching between the drive shaft 14 and barrel 19 (FIG. 1). In contrast, the prior art, such as the tripod shown in FIG. 11, does not maintain symmetry and thus creates variations in velocity and clocking angle between barrel 32 and drive block 33 (FIG. 3).

FIGS. 22–26 show a presently preferred embodiment for a universal joint shaft connecting the barrel: of a pump/motor with a drive shaft. The universal joint shaft includes ball members 120 and 124 which are respectively received within a drive shaft 14 and the cylinder barrel 19 (FIG. 1). Ball 120 is integrally formed with a connection device such as threaded collar 121 which screws into a threaded opening in shaft 14. A plug member 122 integral with ball 120 extends further within the shaft 14. Ball member 124 has a collar 125 and a connection device such as threaded spindle 126 integral therewith. The threaded spindle 126 is threaded into a mating threaded, central bore within the cylinder barrel 19. Balls 120 and 124 are respectively received within socket members 132 and 134. The socket members each include a cup-shaped socket 133, 135 at one side and a plurality of sectors 137 at its opposite side. The sectors 137, in cross-section taken perpendicular to the axis of the universal joint, appear as sectors of an annulus, i.e., pie sectors. The sectors 137 of socket members 132 and 134 are pie-shaped and interlock to prevent the two socket members from moving laterally relative to each other. The balls 120 and 124 are respectively retained in sockets 133 and 135 by torque transfer pins 140. Torque transfer pins 140, in turn, pivot on and are held against lateral displacement from the balls and sockets by retention pins 142. Optional retention rings 144 fit over sockets 133 and 135 with holes receiving opposing ends of the retention pins 142 to retain torque transfer pins 140. Finally, a cage 146 fits over the interengaged sectors 137 of socket members 132 and 134 to allow axial movement while retaining alignment.

Figure 24:
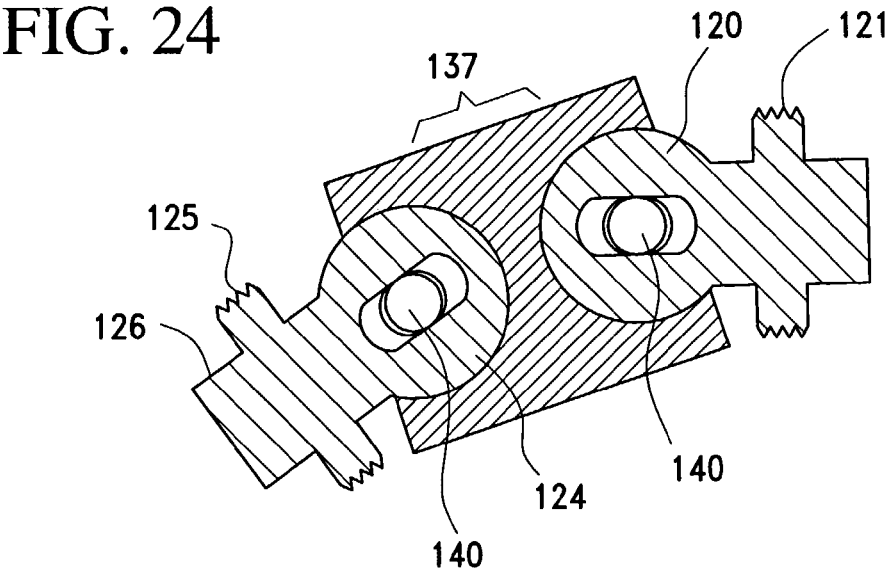
FIG. 24 is another cross-sectional view of the universal joint of FIG. 22.
Figure 25:
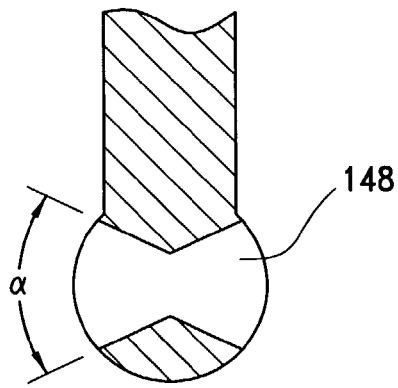
FIG. 25 is a cross-sectional view of one end of a shaft of the universal joint of FIG. 22.
Figure 26:
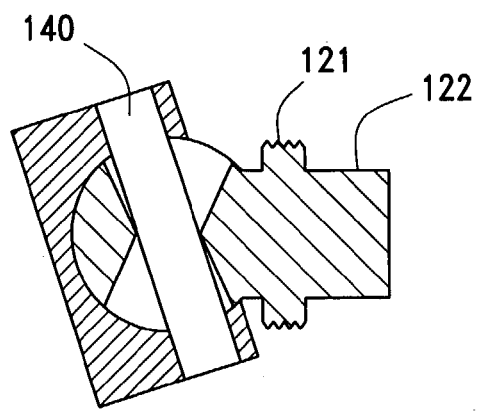
FIG. 26 is a cross-sectional view illustrating details of the universal joint of FIG. 22.

As seen in FIGS. 24–26, each ball has an hourglass-shaped opening 148 which receives a torque transfer pin 140. Each ball 120 and 124 can pivot only through that angle α allowed by the hourglass-shaped opening 148.

The advantages of this presently preferred embodiment of FIGS. 22–26 include those advantages mentioned for the embodiment exemplified in FIGS. 16 and 17. In addition, this presently preferred embodiment has improved ease of assembly, improved velocity matching and improved torque carrying capacity over the flexible drive shaft design of FIGS. 16 and 17.

The presently preferred embodiment utilizes torque transfer pins 140 in place of torque disks 113 and 114. This embodiment strengthens the ball members 120 and 124 when compared with ball head shafts 111 and 118, increasing the torque carrying capacity of the joint. In addition, the inclusion of the cage 146 in the presently preferred embodiment both improves the assembly of the universal joint shaft and constrains the joint in a way to improve velocity matching of the halves.

Figure 18:
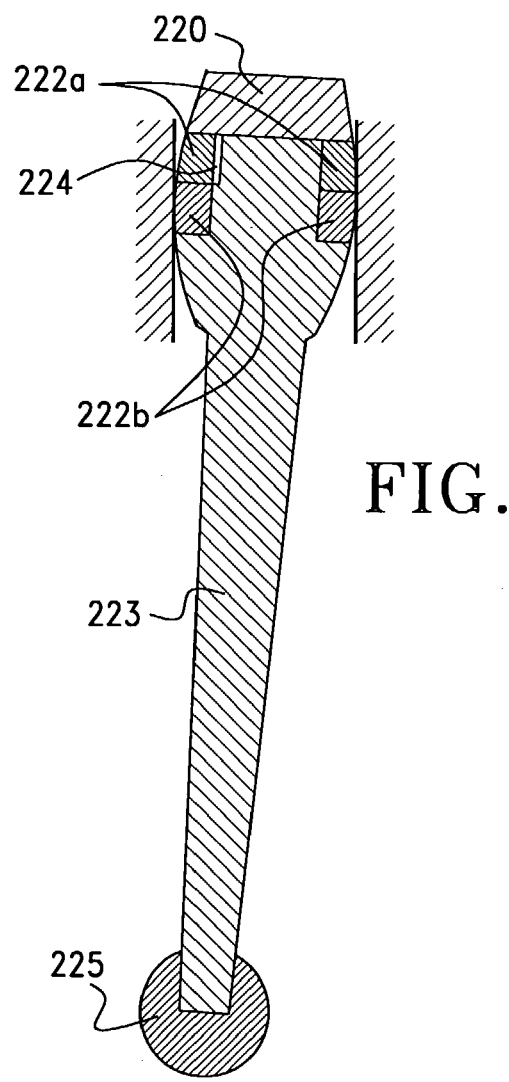
FIG. 18 is an alternative embodiment of the new single-piece piston of FIGS. 9 and 10, with a double ring configuration.

An alternative embodiment of the new single-piece piston of FIGS. 9 and 10 is shown in FIG. 18. This embodiment contains a piston top 220 and a sliding, sealing ring 222a. Ring 222a fits over a narrowed diameter post 224 of rod 223 which allows ring 222a to slide to the appropriate position depending on the angle of rod 223. Ring 222b fits tightly around the locating post 224 of rod 223. In this embodiment, ring 222b can be optimized for load bearing capability and low friction and wear, while ring 222a can be optimized for sealing.

Figure 19:
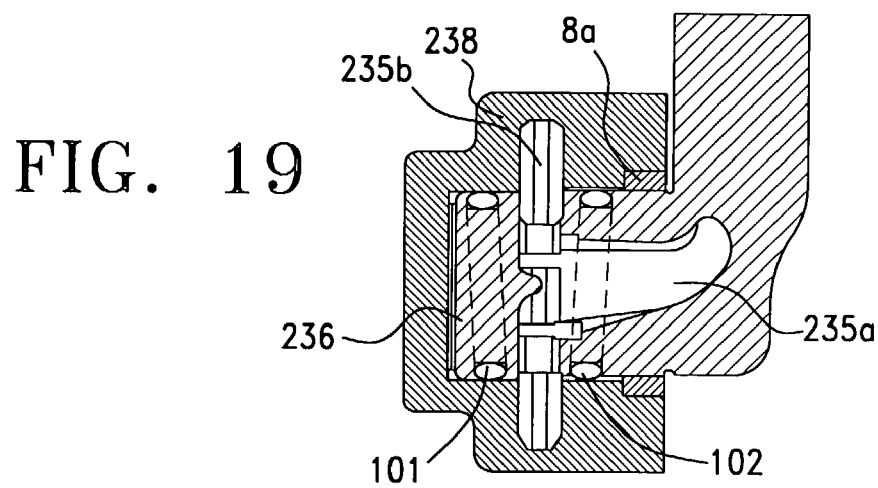
FIG. 19 is a sectional view showing an alternative yoke pin with radial porting.
Figure 20:
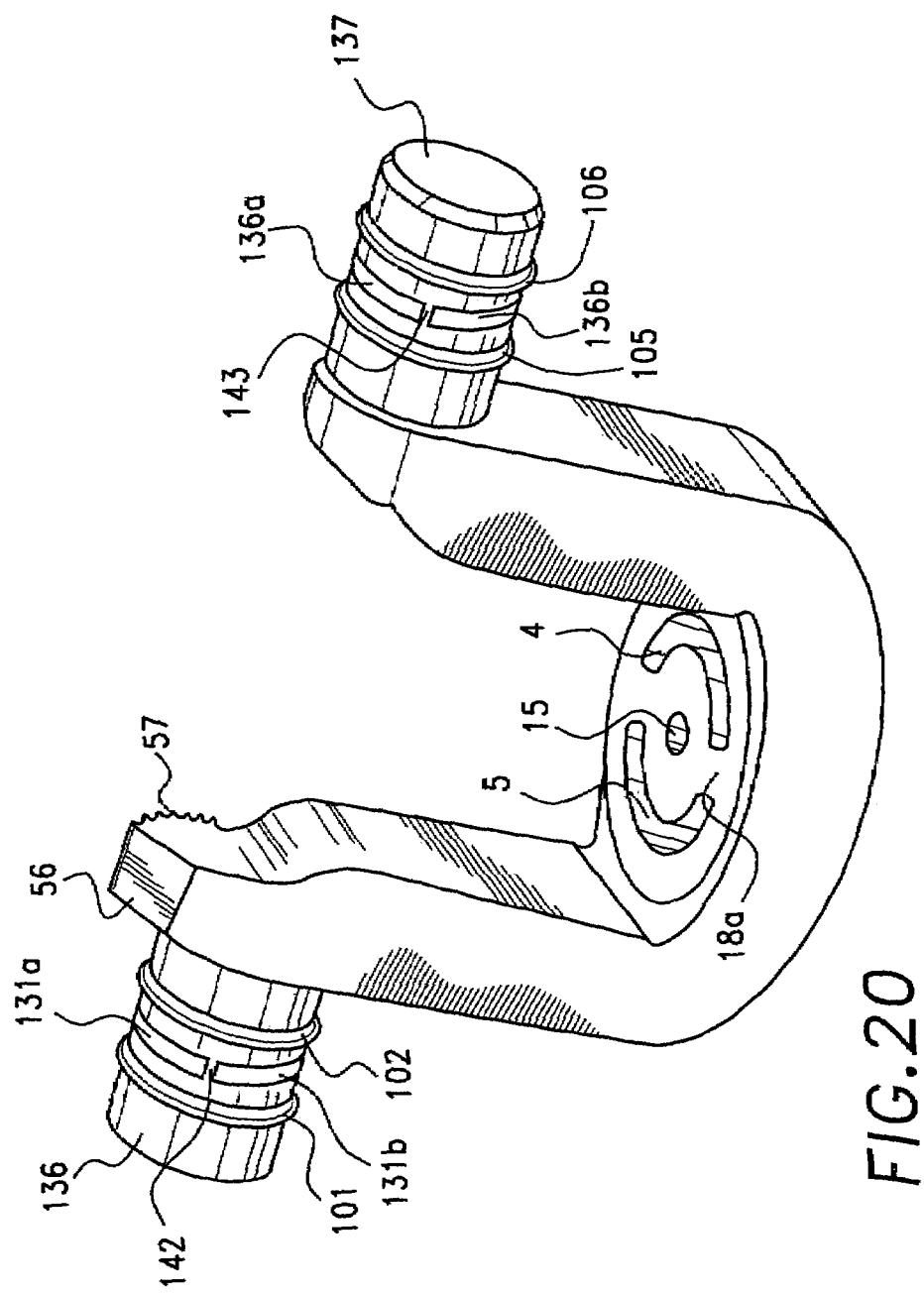
FIG. 20 is a perspective view of the yoke with yoke pins as shown in FIG. 19.

FIGS. 19 and 20 show an alternative yoke pin with radial porting. FIG. 19 can be compared to FIG. 15, and FIG. 20 can be compared to FIG. 2. Yoke pin housing 238 provides an annular chamber 235b supplying fluid to the complete circumference of yoke pin 236 to allow reduced flow pressure losses as fluid flows into port 235a, while also allowing a shorter yoke pin 236. FIG. 20 shows a clear view of the yoke pins 236 and 237. Full circumference radial ports 231a, 231b, 236a and 236b allow high flow rates with low pressure losses. Multiple ribs 242 and multiple ribs 243 separate multiple ports 231a and 231b and multiple ports 236a and 236b. The shorter yoke pins 236 and 237 are evident. Other features seen in FIG. 19 are identical to those of FIG. 15 and identical reference numerals are employed. Likewise, other features shown in FIG. 20 are identical to those shown in FIG. 2 and identical reference numerals are employed.

Figure 21:
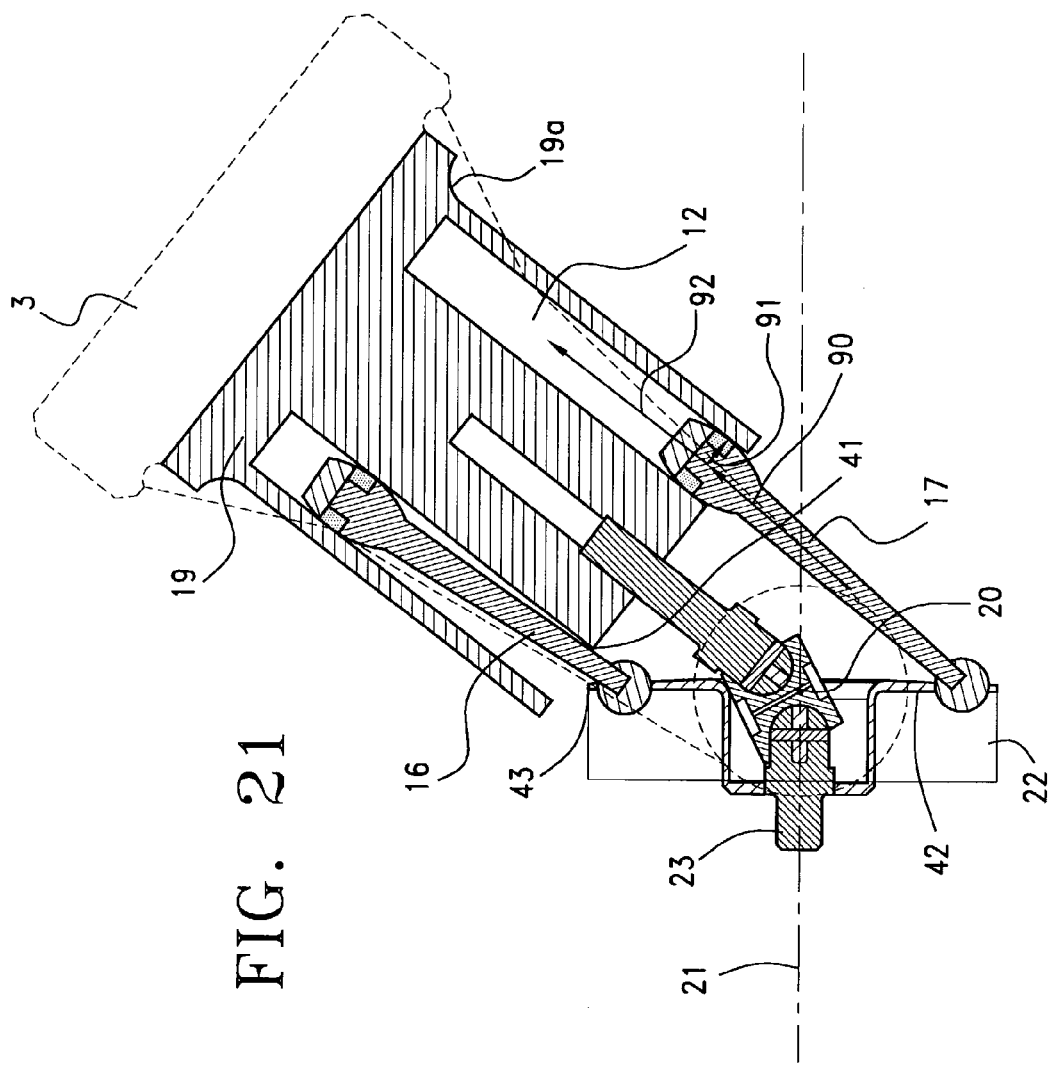
FIG. 21 shows the ball-disc barrel drive-shaft of FIGS. 16 and 17 installed in a pump/motor of the present invention, inclined to 54 degrees.
Figures 22, 23:
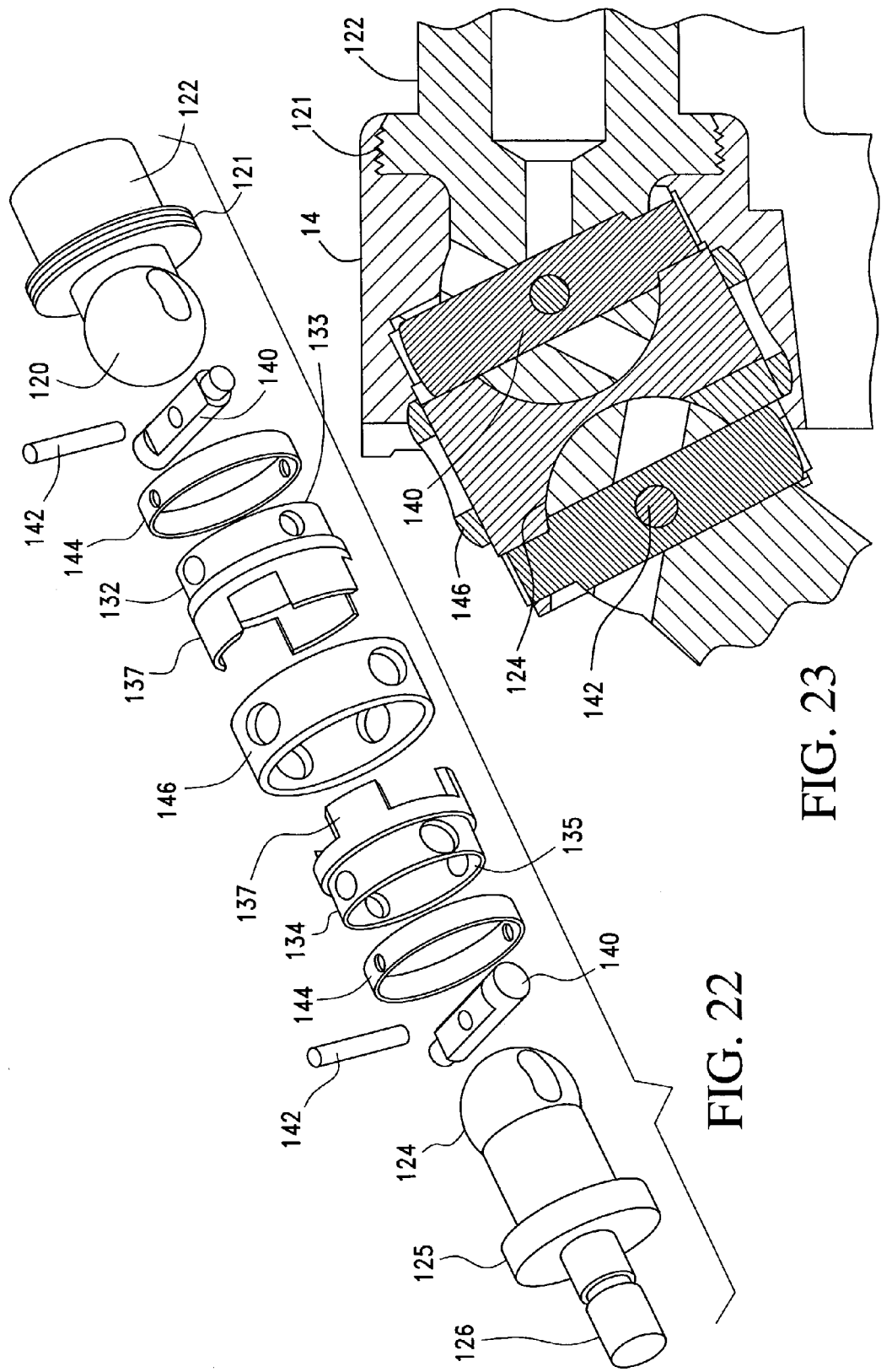
FIG. 22 is an exploded view of a preferred universal joint.
FIG. 23 is a cross-sectional view of the universal joint of FIG. 22.

FIG. 21 shows the ball-disk barrel drive-shaft of FIGS. 16 and 17 installed in a pump/motor of the present invention, inclined to 54 degrees. The features shown in FIG. 21 are numbered identical to the like features shown in FIG. 5, and are identical except for the substitution in FIG. 21 of the ball-disc barrel drive shaft of FIGS. 16 and 17 for the tripode barrel drive shaft of FIG. 5.

Referring to FIG. 9, another set of alternative embodiments would employ differing means of attachment of the ball bearing 85 to piston connecting rod 83. This modification is based on recognition that a standard ball bearing possesses the necessary accuracy and tolerance of size and shape and therefore its use can obviate the need for the traditional costly and labor intensive precision machining process that must be employed to form the one-piece ball and piston connecting rod components of the prior art. While a threaded connection and a friction weld connection are specifically described in this disclosure, many alternate methods of connection will be obvious to those skilled in the art.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A variable displacement hydraulic pump/motor comprising:
    a yoke comprising a pair of axially-aligned shafts defining a pivot axis for said yoke and a valve plate connected to and intermediate said shafts and axially offset relative to said shafts, said valve plate presenting a valve plate surface having a pair of arc-shaped intake and discharge apertures, a radial port formed in each of said shafts and a pair of fluid passages internal to said yoke through which fluid flows perpendicularly to said pivot axis, each fluid passage connecting an arc-shaped aperture with a radial port;
    a cylinder barrel rotatable about a longitudinal axis and having a plurality of piston cylinders formed therein in a circle centered on said longitudinal axis, each piston cylinder being open at one end of said cylinder barrel to receive a piston reciprocably mounted therein and opening at a second end of said cylinder barrel through a fluid port, said second end of said cylinder barrel mating with said valve plate surface for intake of fluid from the arc-shaped intake aperture to a fluid port in communication with one of said piston cylinders and discharge of fluid from another of said piston cylinders through its fluid port and the arc-shaped discharge aperture;
    a drive block mounted on an end of an input/output shaft for rotation about a central axis of rotation inclined at an angle of inclination relative to said longitudinal axis; and
    a plurality of piston rods, each piston rod connected at a first end to one of said pistons and pivotally connected at a second end to said drive block, said second ends being connected to said drive block in a circular array centered on said axis of rotation.

2. A variable displacement hydraulic pump/motor according to claim 1 wherein ball-in-socket joints connect said second ends of said piston rods to said drive block.

3. A variable displacement hydraulic pump/motor according to claim 1 wherein said yoke further comprises a pair of arms having first ends respectively connected to said shafts at said pivot axis and second ends fixed to said valve plate, said pump/motor further comprising:
    drive means for engaging at least one of said first ends of said arms to pivot said yoke to change said angle of inclination and thereby change displacement of the pump/motor.

4. A variable displacement hydraulic pump/motor according to claim 1 further comprising:
    a housing for said yoke, said cylinder barrel and said drive block, said housing having a pair of bushings respectively receiving said shafts; and
    a pair of O-ring seals, on each of said shafts and on opposing sides of said radial port, forming seals between one of said shafts and the bushing receiving the one shaft, said O-ring seals of said pair being slanted, in opposite directions, at an angle of up to 30 degrees to a plane perpendicular to said pivot axis.

5. A variable displacement hydraulic pump/motor according to claim 4 wherein said pair of O-ring seals come closest together at said radial port located therebetween.

6. A variable displacement hydraulic pump/motor according to claim 1 further comprising:

a housing containing said yoke, said cylinder barrel, said drive block and a pair of bushings respectively receiving said shafts, said housing being hermetically sealed and containing lubricating oil at a pressure in excess of 100 psi.

7. A variable displacement hydraulic pump/motor according to claim 1 wherein the circle in which said piston cylinders are arranged has a diameter relative to a diameter of said circular array allowing said cylinder barrel to be pivoted relative to said drive block between a zero displacement angle of inclination where the piston rods just clear a radially outward edge of the cylinder opening at said one end and a maximum displacement angle of inclination where the piston rods just clear a radially inward edge of the cylinder opening at said one end.

8. A variable displacement hydraulic pump/motor according to claim 1 further comprising:
    a raised annular grid extending from said second end of said cylinder barrel, said fluid ports being surrounded and separated by said grid; and
    a second raised annular area extending from said second end of said cylinder barrel coextensive with and spaced radially outward from said annular grid.

9. A variable displacement hydraulic pump/motor according to claim 1 wherein said cylinder barrel is flared outward at said second end.

10. A variable displacement hydraulic pump/motor according to claim 8 wherein said second raised annular area is circumferentially segmented by gaps between the segments.

11. A variable displacement hydraulic pump/motor according to claim 1 wherein said piston comprises a piston comprising a piston head in the form of a portion of a sphere, a piston rod joined to said piston head at a point of attachment and a spherical ball attached at an end of said piston rod opposite said piston head, said piston head having a pressure receiving face opposite said point of attachment;
    wherein said piston head defines a plane parallel to said pressure receiving face and extending through a center of said sphere portion whereby a diameter of said sphere lies within said plane, said piston further comprises a sealing piston ring and a circumferential groove receiving said piston ring and disposed with said plane cutting therethrough; and
    wherein said piston head, said piston rod and said spherical ball are integrated together in a non-articulating manner.

12. A variable displacement hydraulic pump/motor according to claim 1 wherein said piston comprises a piston head, a piston rod joined to said piston head at one end and to a spherical ball at an opposite end, said one end of said piston rod having a reduced diameter forming a post, and first and second sealing rings mounted on said post, said first sealing ring arranged axially intermediate said piston head and said second sealing ring, said second sealing ring being tightly fitted on said post and said first sealing ring being more loosely mounted on said post for sliding movement relative to said post.

13. A variable displacement hydraulic pump/motor according to claim 1 further comprising:
    a universal joint comprising a drive block shaft fixed to said drive block, a first torque disc rotatably mounted in an end of said drive block shaft, a cylinder barrel shaft fixed to said cylinder barrel, a second torque disc rotatably mounted in an end of said cylinder barrel shaft and a pair of pivotally connected coupling halves, each of said coupling halves having a recess receiving one of said torque discs.

14. A variable displacement hydraulic pump/motor according to claim 1 wherein the circle on which said piston cylinders are centered in said barrel has a diameter which is smaller than a diameter of said circular array in said drive block.

15. A variable displacement hydraulic pump/motor according to claim 1
    wherein each of said fluid ports is defined by radially inward and radially outward arcuate surfaces and generally radially extending surfaces joining said arcuate surfaces said radially inward and radially outward arcuate surfaces defining a center line therebetween which is radially outward of a central, longitudinal axis of an associated cylinder bore.

16. A variable displacement hydraulic pump/motor according to claim 15 wherein said radially outward arcuate surface extends circumferentially substantially beyond a cross-section of the associated cylinder bore.

17. A variable displacement hydraulic pump/motor according to claim 1 wherein said piston rods are tapered from said first ends connected to said pistons to said second ends connected to balls pivotally engaged in sockets within said drive block, said first ends having a larger diameter than said second ends.

18. A variable displacement hydraulic pump/motor according to claim 17 wherein bodies of said pistons are integrally formed with said piston rods and said balls in a single piece construction.

19. A variable displacement hydraulic pump/motor according to claim 1 further comprising a universal joint, said universal joint comprising:
    first and second socket members each having a concave spherical socket at one end thereof and a plurality of annular sectors at an opposite end thereof, said sectors of one joint member interlocking with the sectors of a second joint member to lock the two socket members together for turning as a unit and for preventing lateral displacement of one socket member relative to the other;
    a pair of ball members each having a convex spherical surface seated within one of said concave sockets, each of said ball members having an extension for connection to, respectively, said input/output shaft and said cylinder barrel, and said ball members each having a slot through the ball in cross-section;
    a pin extending laterally through said socket and through said slot of a ball member mounted within said socket for retaining a ball member within a concave socket and for transmitting torque from said ball to said socket.

20. A variable displacement hydraulic pump/motor according to claim 19 further comprising:
    a cage surrounding said interlocking sectors for aligning said socket members.

21. A variable displacement hydraulic pump/motor comprising:
    a yoke comprising a pair of shafts aligned to define a yoke pivot axis, a pair of arms having first ends on said pivot axis and respectively fixed to said shafts, said arms extending perpendicular from said shafts to second ends, and a valve plate connected to and extending between said second ends, said valve plate presenting a valve plate surface having intake and discharge apertures;
    a cylinder barrel mounted for rotation about a longitudinal axis and having a plurality of piston cylinders formed therein in a circle centered on said longitudinal axis, each piston cylinder being open at one end of said cylinder barrel to receive a piston head reciprocably mounted therein and having a cylinder opening at a second end of said cylinder barrel, said second end of said cylinder barrel presenting an end surface mounted flush against said valve plate surface whereby said cylinder openings come into communication alternately with said intake and discharge apertures as said cylinder barrel rotates;

a drive block mounted on an end of an input/output shaft for rotation about a central axis of rotation inclined at an angle of inclination relative to said longitudinal axis, said drive block comprising a drive block body having sockets with socket openings at one surface and a retention plate, having plate openings corresponding to and smaller than said socket openings, with balls fixed to said second ends of said piston rods and retained within said sockets by said retention plate, said retention plate being thinner adjacent at least one side of said plate openings;

a plurality of piston rods, each piston rod connected at a first end to one of said pistons and pivotally connected at a second end to said drive block, said second ends being connected to said drive block in a circular array centered on said axis of rotation; and drive means for engaging at least one of said first ends of said arms to pivot said yoke to change angle of inclination.

22. A variable displacement hydraulic pump/motor according to claim 21 wherein said drive means includes engagement means integrally formed on said one first ends of said arm and wherein said shafts are integrally formed with said arms and said valve plate, whereby said yoke has a single piece construction.

23. A variable displacement hydraulic pump/motor according to claim 21 wherein said drive means comprises a gear sector formed on at least one of said first ends of said arm and a rack having teeth meshing with said gear sector.

24. A variable displacement hydraulic pump/motor according to claim 21 further comprising a universal joint, said universal joint comprising:

first and second socket members each having a concave spherical socket at one end thereof and a plurality of annular sectors at an opposite end thereof, said sectors of one joint member interlocking with the sectors of a second joint member to lock the two socket members together for turning as a unit and for preventing lateral displacement of one socket member relative to the other;

a pair of ball members each having a convex spherical surface seated within one of said concave sockets, each of said ball members having an extension for connection to, respectively, said input/output shaft and said cylinder barrel, and said ball members each having a slot through the ball in cross-section; and a pin extending laterally through said socket and through said slot of a ball member mounted within said socket for retaining a ball member within a concave socket and for transmitting torque from said ball to said socket.

25. A variable displacement hydraulic pump/motor comprising:

a yoke comprising a pair of shafts aligned to define a yoke pivot axis, a pair of arms having first ends on said pivot axis and respectively fixed to said shafts, said arms extending perpendicular from said shafts to second ends, and a valve plate connected to and extending between said second ends, said valve plate presenting a valve plate surface having intake and discharge apertures;

a cylinder barrel mounted for rotation about a longitudinal axis and having a plurality of piston cylinders formed therein in a circle centered on said longitudinal axis, each piston cylinder being open at one end of said cylinder barrel to receive a piston head reciprocably mounted therein and having a cylinder opening at a second end of said cylinder barrel, said second end of said cylinder barrel presenting an end surface mounted flush against said valve plate surface whereby said cylinder openings come into communication alternately with said intake and discharge apertures as said cylinder barrel rotates;

a drive block mounted on an end of an input/output shaft for rotation about a central axis of rotation inclined at an angle of inclination relative to said longitudinal axis; and a plurality of piston rods, each piston rod connected at a first end to one of said pistons and pivotally connected at a second end to said drive block, said second ends being connected to said drive block in a circular array centered on said axis of rotation;

wherein each of said cylinder openings is defined by radially inward and radially outward arcuate surfaces and generally radially extending surfaces joining said arcuate surfaces said radially inward and outward arcuate surfaces defining a center line therebetween which is radially outward of a central, longitudinal axis of an associated cylinder bore.

26. A variable displacement hydraulic pump/motor according to claim 25 wherein said radially outward arcuate surface extends circumferentially substantially beyond a cross-section of the associated cylinder bore.

27. A variable displacement hydraulic pump/motor according to claim 25 wherein said radially inward and radially outward surfaces and said radially extending surfaces extend axially outward to form a first raised annular area on said end surface substantially radially inward of the circumferential edge of said end surface.

28. A variable displacement hydraulic pump/motor according to claim 27 further comprising a second raised annular area on said end surface spaced radially outward of said first raised annular area.

29. A variable displacement hydraulic pump/motor according to claim 25 wherein said piston comprises a piston comprising a piston head in the form of a portion of a sphere, a piston rod joined to said piston head at a point of attachment and a spherical ball attached at an end of said piston rod opposite said piston head, said piston head having a pressure receiving face opposite said point of attachment;

wherein said piston head defines a plane parallel to said pressure receiving face and extending through a center of said sphere portion whereby a diameter of said sphere lies within said plane, said piston further comprises a sealing piston ring and a circumferential groove receiving said piston ring and disposed with said plane cutting therethrough; and wherein said piston head, said piston rod and said spherical ball are integrated together in a single piece construction.

30. A variable displacement hydraulic pump/motor according to claim 25 further comprising:

a housing containing said yoke, said cylinder barrel, said drive block and a pair of bushings respectively receiving said shafts, said housing being hermetically sealed and containing lubricating oil at a pressure in excess of 100 psi.

31. A variable displacement hydraulic pump/motor according to claim 25 further comprising a universal joint, said universal joint comprising:

first and second socket members each having a concave spherical socket at one end thereof and a plurality of annular sectors at an opposite end thereof, said sectors of one joint member interlocking with the sectors of a second joint member to lock the two socket members together for turning as a unit and for preventing lateral displacement of one socket member relative to the other;

a pair of ball members each having a convex spherical surface seated within one of said concave sockets, each of said ball members having an extension for connection to, respectively, said input/output shaft and said cylinder barrel, and said ball members each having a slot through the ball in cross-section; and a pin extending laterally through said socket and through said slot of a ball member mounted within said socket for retaining a ball member within a concave socket and for transmitting torque from said ball to said socket.

32. A variable displacement hydraulic pump/motor according to claim 25 wherein said input/output shaft is a hollow cylinder.

33. A variable displacement hydraulic pump/motor according to claim 25 wherein the radial port in each of said shaft consists of circumferential port segments extending around the shaft circumference.

34. A piston comprising a piston head, a piston rod joined to said piston head at one end and to a spherical ball at an opposite end, said one end of said piston rod having a reduced diameter forming a post, and first and second sealing rings mounted on said post, said first sealing ring arranged axially intermediate said piston head and said second sealing ring, said second sealing ring being tightly fitted on said post and said first sealing ring being more loosely mounted on said post for sliding movement relative to said post.

35. A variable displacement hydraulic pump/motor comprising:
a yoke comprising a pair of shafts aligned to define a yoke pivot axis, a pair of arms having first ends on said pivot axis and respectively fixed to said shafts, said arms extending perpendicular from said shafts to second ends, and a valve plate connected to and extending between said second ends, said valve plate presenting a valve plate surface having intake and discharge apertures;
a cylinder barrel having one end flared to form a larger end face than an end face at an opposite end of said cylinder barrel, said cylinder barrel being mounted for rotation about a longitudinal axis and having a plurality of piston cylinders formed therein in a circle centered on the longitudinal axis, each of said piston cylinders formed therein in a circle centered on the longitudinal axis, each of said piston cylinders being open at said opposite end to receive a piston reciprocably mounted therein and having a fluid port at said one end, said one end being sealed against said valve plate surface, whereby the fluid ports come into communication alternately with the intake and discharge apertures as said cylinder barrel rotates;
a drive block mounted on an end of an input/output shaft for rotation about a central axis of rotation inclined at an angle of inclination relative to said longitudinal axis; and
a plurality of piston rods, each piston rod connected at a first end to one of said pistons and pivotally connected at a second end to said drive block, said second ends being connected to said drive block in a circular array centered on said axis of rotation.

36. A variable displacement hydraulic pump/motor according to claim 35 wherein said one end face has a raised circumferential annular ridge at an outer periphery and a raised inner annular grid surrounding and isolating each of the fluid ports and radially spaced from said annular ridge, said annular ridge and said annular grid sealing against said valve plate surface.

37. A variable displacement hydraulic pump/motor according to claim 35
wherein each of said fluid ports is defined by radially inward and radially outward arcuate surfaces and generally radially extending surfaces joining said arcuate surfaces said radially inward and radially outward arcuate surfaces defining a center line therebetween which is radially outward of a central, longitudinal axis of an associated cylinder bore.

38. A variable displacement hydraulic pump/motor according to claim 35 further comprising a universal joint, said universal joint comprising:
first and second socket members each having a concave spherical socket at one end thereof and a plurality of annular sectors at an opposite end thereof, said sectors of one joint member interlocking with the sectors of a second joint member to lock the two socket members together for turning as a unit and for preventing lateral displacement of one socket member relative to the other;
a pair of ball members each having a convex spherical surface seated within one of said concave sockets, each of said ball members having an extension for connection to, respectively, said input/output shaft and said cylinder barrel, and said ball members each having a slot through the ball in cross-section; and
a pin extending laterally through said socket and through said slot of a ball member mounted within said socket for retaining a ball member within a concave socket and for transmitting torque from said ball to said socket.

39. A variable displacement hydraulic pump/motor according to claim 35 wherein said input/output shaft is a hollow cylinder.

40. A universal joint comprising:
first and second socket members each having a concave spherical socket at one end thereof and a plurality of annular sectors at an opposite end thereof, said sectors of one joint member interlocking with the sectors of a second joint member to lock the two socket members together for turning as a unit and for preventing lateral displacement of one socket member relative to the other;
a pair of ball members each having a convex spherical surface seated within one of said concave sockets, each of said ball members having an extension for connection to, respectively, said input/output shaft and said cylinder barrel, and said ball members each having a slot through the ball in cross-section; and
a pin extending laterally through said socket and through said slot of a ball member mounted within said socket for retaining a ball member within a concave socket and for transmitting torque from said ball to said socket.

* * * * *